United States Patent
Alon et al.

(10) Patent No.: US 9,300,523 B2
(45) Date of Patent: Mar. 29, 2016

(54) SYSTEM AND METHOD FOR PERFORMANCE MANAGEMENT IN A MULTI-TIER COMPUTING ENVIRONMENT

(75) Inventors: Amir Alon, Cresskill, NJ (US); Yoram Yori Lavi, New York, NY (US); Mordechai Tal, Kfar Saba (IL); Adam Honen, Tel Aviv (IL); Dan Pinkus, Ramat Gan (IL); Amidan Tabak, Rosh Hain (IL)

(73) Assignee: SAP SE, Walldorf (DE)

( * ) Notice: Subject to any disclaimer, the term of this patent is extended or adjusted under 35 U.S.C. 154(b) by 529 days.

(21) Appl. No.: 13/563,063

(22) Filed: Jul. 31, 2012

(65) Prior Publication Data

US 2012/0331135 A1   Dec. 27, 2012

Related U.S. Application Data

(63) Continuation-in-part of application No. 13/533,498, filed on Jun. 26, 2012, now abandoned, which is a continuation of application No. 12/860,239, filed on Aug. 20, 2010, now Pat. No. 8,214,495, which is a continuation of application No. 11/088,277, filed on Mar. 23, 2005, now Pat. No. 7,805,509.

(60) Provisional application No. 60/576,805, filed on Jun. 4, 2004.

(51) Int. Cl.
G06F 15/173 (2006.01)
H04L 12/24 (2006.01)
H04L 12/26 (2006.01)
G06F 11/34 (2006.01)
(Continued)

(52) U.S. Cl.
CPC .......... *H04L 41/044* (2013.01); *G06F 11/3495* (2013.01); *G06Q 10/10* (2013.01); *H04L 43/103* (2013.01); *H04L 67/125* (2013.01); *G06F 11/3409* (2013.01); *G06F 11/3419* (2013.01); *G06F 2201/81* (2013.01); *G06F 2201/865* (2013.01); *G06F 2201/87* (2013.01); *G06F 2201/875* (2013.01)

(58) Field of Classification Search
CPC .................................... G06F 11/3006
USPC .................................. 709/223, 224
See application file for complete search history.

(56) References Cited

U.S. PATENT DOCUMENTS 5,655,081 A   8/1997   Bonnell et al.
5,958,010 A   9/1999   Agarwal et al.
(Continued)

FOREIGN PATENT DOCUMENTS

EP   1191751 B1   3/2002

OTHER PUBLICATIONS

International Search Report for International Application No. PCT/IL05/00361, dated May 30, 2006, 6 pages.
(Continued)

*Primary Examiner* — Wing F Chan
*Assistant Examiner* — Andrew Woo
(74) *Attorney, Agent, or Firm* — Fish & Richardson P.C.

(57) ABSTRACT

A method of profiling code executed within a monitored tier of a multi-tier computing system includes the steps of periodically sampling the code executed by processing enclaves of the monitored tier, determining in real-time the periodical sampling overhead, dynamically adjusting the periodical sampling rate, identifying the business context of each code sample, and merging request traffic data and profiling data for presenting to an operator of the multi-tier system.

15 Claims, 14 Drawing Sheets

(51) Int. Cl.
*H04L 29/08* (2006.01)
*G06Q 10/10* (2012.01)

(56) References Cited

U.S. PATENT DOCUMENTS

| | | | |
|---|---|---|---|
| 6,108,700 | A | 8/2000 | Maccabee et al. |
| 6,311,324 | B1 * | 10/2001 | Smith et al. ............ 717/114 |
| 6,597,684 | B1 | 7/2003 | Gulati et al. |
| 6,621,895 | B1 | 9/2003 | Giese |
| 6,636,847 | B1 | 10/2003 | Spires |
| 6,748,416 | B2 | 6/2004 | Carpenter et al. |
| 6,823,382 | B2 | 11/2004 | Stone |
| 7,003,781 | B1 * | 2/2006 | Blackwell et al. ............ 719/327 |
| 7,284,162 | B2 | 10/2007 | Dragnea et al. |
| 8,381,196 | B2 * | 2/2013 | Warren ............ G06F 11/323 717/129 |
| 2002/0059429 | A1 * | 5/2002 | Carpenter et al. ............ 709/227 |
| 2002/0078382 | A1 | 6/2002 | Sheikh et al. |
| 2002/0129137 | A1 | 9/2002 | Mills et al. |
| 2003/0143988 | A1 | 7/2003 | Jamadagni |
| 2003/0163608 | A1 * | 8/2003 | Tiwary et al. ............ 710/1 |
| 2004/0001491 | A1 | 1/2004 | Ruutu et al. |
| 2004/0128654 | A1 * | 7/2004 | Dichter ............ G06F 11/3423 717/128 |
| 2005/0240835 | A1 | 10/2005 | Dragnea et al. |
| 2008/0148099 | A1 | 6/2008 | Bhat et al. |
| 2008/0320587 | A1 * | 12/2008 | Vauclair et al. ............ 726/17 |
| 2010/0277302 | A1 * | 11/2010 | Cohn et al. ............ 340/514 |

OTHER PUBLICATIONS

Nichols et al., "Definition of the Differentiated Services Field (DS Field) in the Ipv4 and Ipv6 Headers", Network Working Group, Dec. 1998.

* cited by examiner

SYSTEM AND METHOD FOR PERFORMANCE MANAGEMENT IN A MULTI-TIER COMPUTING ENVIRONMENT

RELATED APPLICATIONS

This claims priority to and is a continuation-in-part of U.S. patent application Ser. No. 13/533,498, filed on Jun. 26, 2012, which is a continuation of U.S. patent application Ser. No. 12/860,239, filed on Aug. 20, 2010, now U.S. Pat. No. 8,214,495, which is a continuation of U.S. patent application Ser. No. 11/088,277, filed on Mar. 23, 2005, now U.S. Pat. No. 7,805,509, which claims priority to U.S. Provisional Application No. 60/576,805, filed on Jun. 4, 2004. The entirety of each of these related cases is incorporated herein by reference.

FIELD OF THE DISCLOSED TECHNIQUE

The disclosed technique relates to managing distributed computing environments in general, and to a system and method for application performance management in a multi-tier computing environment, in particular.

BACKGROUND OF THE DISCLOSED TECHNIQUE

Information Technology (IT) is responsible for delivering application services using an increasingly complex multi-tier production environment with a heterogeneous application mix. IT operations are struggling to meet required service levels in performance and availability, while being pressed to increase efficiency and resource utilization. Consolidation of IT resources, together with business concerns, exacerbates this effect, stretching the capability of IT operations to meet ever changing demands for computing resources. Traditional approaches and tools for performance and availability management are variations of the never-ending "monitor-tune-fix" cycle, which involves identifying that a problem exists (i.e., monitoring), increasing overall throughput to overcome the problem (i.e., tuning), and performing root-cause analysis to uncover the precise cause of each specific instance of a problem (i.e., fixing). Such approaches are unable to cope with the complexity and variability of the rapidly changing IT environment.

Reference is now made to FIG. 1, which is a schematic illustration of a multi-tier computing environment, generally referenced 50, which is known in the art. Computing environment 50 includes a first client 62 running a first application, a second client 64 running a second application, a first tier 52, a second tier 54, a third tier 56, a fourth tier 58, and a fifth tier 60. The first tier 52 is a web server. The second tier 54 is an application server, application server A. The third tier 56 is another application server, application server B. The fourth tier 58 is a further application server, application server C. The fifth tier 60 is a database. First tier 52 is coupled with first client 62, with second client 64, and with second tier 54. Second tier 54 is further coupled with third tier 56 and with fourth tier 58. Third tier 56 is further coupled with fourth tier 58 and with fifth tier 60. Fourth tier 58 is further coupled with fifth tier 60.

A "tier" represents a certain type of processing that is part of the overall delivery of an IT service (e.g., presentation level processing on a web server tier or data processing on a database tier). Each tier typically runs on a different host machine.

The first application initiates a user request R1 and sends user request R1 to first tier 52. User request R1 is part of an overall transaction initiated by the user. User request R1 may be, for example, a web based query to retrieve information from a certain application. User request R1 may require the services of different tiers in computing environment 50 and may generate additional requests in order to obtain these services. The tier that receives a request either replies to the tier that sent the request, or sends a new request to a different tier. Eventually a reply is returned in response to the original user request R1. A given tier can only request a service from another tier in computing environment 50 if the two tiers are directly coupled with each other.

Overall management of distributed computing environment 50 requires knowledge of how each tier handles its workload. For example, given a shortage of resources on one tier, a system administrator may scale this tier by creating clones of the tier, both vertically (i.e., within the same host machine) and horizontally (i.e., across multiple host machines). For example, in computing environment 50, the system administrator may add an additional application server A2 (not shown) to second tier 54 application server A, wherein application server A2 is a clone of application server A. By the same token, if an overabundance of resources exists on a tier, the system administrator may transfer free resources to another tier which has a shortage of resources. The system administrator may further configure a certain tier in order to improve the overall performance or indicate modifications to optimize the application running on the tier. This is an example of tier specific application monitoring for performance management. It is noted that a request might reach only certain tiers in computing environment 50. Furthermore, the same request might reach certain tiers using multiple paths. For example, in computing environment 50, a request may reach fifth tier 60 database via either third tier 56 application server B, or via fourth tier 58 application server C. As the request paths are not consistent across the entire environment, solving the resource shortage on one tier does not necessarily guarantee the performance of the overall application, which may span multiple tiers. A processing bottleneck in any tier will delay all application functions that depend on that tier.

First tier 52 receives user request R1. First tier 52 allocates processing enclave X1 to process user request R1. While processing user request R1, the application logic executing in processing enclave X1 determines it cannot complete processing user request R1 without additional information or operations to be provided by second tier 54. First tier 52 then sends a subsequent request R2 to second tier 54, requesting the additional information or operations. Second tier 54 allocates processing enclave X2 to process request R2. The application logic executing in processing enclave X2 determines that request R2 requires further information or operations to be provided by fourth tier 58. Second tier 54 then sends a subsequent request R3 to fourth tier 58. Fourth tier 58 allocates processing enclave X4 to process request R3.

Processing enclave X4 completes execution. Fourth tier 58 returns a reply R3' to second tier 54, in response to earlier request R3 of second tier 54. Processing enclave X2 receives reply R3' and resumes processing. Once processing enclave X2 has completed execution, second tier 54 returns a reply R2' to first tier 52, in response to earlier request R2 of first tier 52. Processing enclave X1 receives reply R2' and resumes processing. Once processing enclave X1 has completed execution, first tier returns a reply R1' to user request R1, whose service has now been completed.

In computing environment 50, each of the different tiers is isolated from the tiers which are not directly coupled therewith. For example, request R3 from second tier 54 to fourth tier 58, directly coupled therewith, does not necessarily include information relating to a former request R2, which was received in second tier 54 from first tier 52, nor does request R3 include information relating to user request R1. A given tier has no way of obtaining certain information related to the request being processed at that tier, such as which user initiated the transaction, which requests preceded the request which is being processed at the given tier, or characteristics of requests which preceded that request. For example, second tier 54 cannot identify characteristics of request R2, such as whether the request was preceded by user request R1 sent to first tier 52, or that the transaction originated at user request R1 from first application 62. As a result, if a priority level is assigned to a processing enclave processing a request within a certain tier, that priority level is assigned taking into account only the minimal information which is available on the tier. This information includes the request characteristics (e.g., the tier login credentials used by the request) and perhaps information about the processing enclave processing that request (e.g., the database session identification). Requests are generally processed on an equal priority basis (e.g., first-come-first-serve), though mechanisms operating to differentiate priority levels are available locally on a given tier. Performance management must be done on an individual tier basis, as the other tiers in computing environment 50 cannot be accounted for when dealing with a specific tier. Typically, a system administrator who is responsible for managing a multi-tier computing environment such as computing environment 50 attempts to improve performance by adjusting the resource allocation for a given tier.

U.S. Pat. No. 5,958,010 to Agarwal et al. entitled "Systems and methods for monitoring distributed applications including an interface running in an operating system kernel", is directed to systems and methods for monitoring enterprise wide operation of a distributed computing system to develop business transaction level management data for system performance, usage trends, security auditing, capacity planning, and exceptions. A system having a distributed computing architecture includes multiple workstations, servers, and network devices. Each workstation is representative of a computer system coupled to a network. Each workstation is capable of requesting service from any of the servers. Each workstation has a communication stack for exchanging data with the network. The system further includes a plurality of monitoring agents, and a console module with a database connected therewith. Each monitoring agent has an external event interface that provides event information about various components of an enterprise. Each of the monitoring agents is associated with a respective one of the workstations or servers.

The monitoring agent may physically reside on the associated client or server thereof. The monitoring agent monitors and collects data being exchanged between a client and the network, and between a server and the network. Each monitoring agent can be a software module, a hardware device, or a combination thereof. Each monitoring agent passes information representative of the collected data to the console module. The console module stores this information within the database for analysis by an operator. An application program running on the console module can view the collected data to show system performance of any process or component of the enterprise. A system administrator can develop enterprise level usage statistics and response times, develop charts and reports, and perform other relevant data analysis for determining user-defined statistics relevant to the operation of the enterprise.

U.S. Pat. No. 6,108,700 to Maccabee et al entitled "Application end-to-end response time measurement and decomposition", is directed to a method and system for measuring and reporting availability and performance of end-to-end business transactions. The system operates on a client-server application architecture. The system includes three logical components: Event Generation, Transaction Generation, and Report Generation, as well as overall system management via System Administration.

The Event Generation component exists on every computer being measured in the architecture. Each computer has one Agent, a plurality of Sensors and a plurality of Processors. The Sensors interact with platform components on which business applications run, monitor application activities, and detect changes of state. When appropriate, each of the Sensors generates an event that describes the change in state, when and where the event occurred, and any extra data necessary to uniquely identify the event. An event contains a time-stamp and correlation data used later by the system to associate the event with other events into transactions. The Sensors forward the generated events to their respective Agents. The Agents temporarily store the data and may distribute the data to other system components having registered interest in the event. A Processor analyzes the events and further deduces changes in state. The changes in state may be directly related to actions occurring within the business transaction platform components or derived by combining previously generated events from Sensors or other Processors to describe states achieved. The Processors forward the generated events to their respective Agents.

The Transaction Generation component typically exists in one of the computers in the network and includes a Director. The Director receives events from the Agents under control thereof. The events are examined, and correlated and collated into transactions based on transaction generation rules. The System Administrator determines which transactions to generate.

The Report Generation component includes a Manager. The Manager collects the transactions from the Directors. The collected transactions are manipulated to obtain information relating to the availability and performance of business transactions. A report or continuous graphic monitoring can be produced upon a specific or periodic request from a Graphical User Interface (GUI). Report Generation includes definition of the initial selection and processing of transactions, as well as the sorting and aggregation methods used to consolidate the transactions event data into availability and performance information.

U.S. Patent Application No. 2002/0129137 A1 to Mills et al. entitled "Method and system for embedding correlated performance measurements for distributed application performance decomposition", is directed to techniques for embedding correlated performance measurements in transactions associated with a distributed application. The techniques are used in accordance with application performance decomposition. Data is embedded in a communications protocol used to carry a transaction between application components in a distributed computing network, rather than altering the actual transaction data itself. The embedded data may include a timestamp and duration measurement data. The format of the embedded data combines a well-defined keyword prefix with a variable suffix that identifies the timing source, followed by a colon delimiter and whitespace, and followed by the time stamp and duration information.

Subsequent processing stages of the distributed application can interpret the communications protocol to glean processing durations of previous stages, in order to make decisions regarding treatment of the transaction. The measurement information is embedded within the same distributed application described by the measurement information, so that completion of the transaction occurs simultaneous or contemporaneous with availability of knowledge of the transaction performance characteristics.

A possible communications protocol is the HyperText Transport Protocol (HTTP). A possible distributed computing network is the World Wide Web (WWW). The application components may be a client application running on a client and a server application running on an application server. For example, the client application is a web browser, and the server application runs on a web server. An application transaction is the client application requesting content from the application server and the application server responding. Performance information is generated to measure the round trip response time from the perspective of the client application, as well as to decompose the response time into the time taken by the server application to service the request and generate a reply. In particular, lines are added to the HTTP headers to carry performance measurement data, allowing the client to receive the server measurement duration in the HTTP Reply header.

SUMMARY OF THE DISCLOSED TECHNIQUE

In accordance with the disclosed technique, there is thus provided an apparatus for monitoring a selected tier in a multi-tier computing environment. The apparatus includes a context agent and a dynamic tier extension. The context agent is associated with a selected tier, and is coupled with other context agents, each of which is associated with a respective tier. The dynamic tier extension is coupled with the context agent and with specific predetermined points of the selected tier, such as at least a request entry port of the selected tier. The dynamic tier extension monitors request traffic passing through the selected tier, the monitored request traffic including at least one entering request received at a request entry port from an adjacent tier. The dynamic tier extension identifies each request in the monitored request traffic and sends at least the request identifier to the context agent. The context agent also receives information relating to the request context of the entering request from the context agent associated with the adjacent tier. The context agent associates the information relating to the request context of the entering request with the entering request, in accordance with the received request identifier.

The dynamic tier extension may further be coupled with a request exit port of the selected tier, and the monitored request traffic further includes at least one exiting request exiting the selected tier to an adjacent tier. The dynamic tier extension captures the request context of the exiting request and sends at least the request identifier and information relating to the request context of the exiting request to the context agent. The context agent associates the entering request with the exiting request, in accordance with the received information and request identifiers. The context agent further provides information relating to the request context of the exiting request to the context agent associated with the adjacent tier to which the exiting request was sent.

In accordance with the disclosed technique, there is further provided a system for application performance management in a multi-tier computing environment including a plurality of tiers. The system includes, for each of at least two monitored tiers of the plurality of tiers, a respective dynamic tier extension and a respective context agent. The dynamic tier extension is coupled with at least a request entry port of the monitored tier. The context agent is coupled with the dynamic tier extension and with other context agents associated with the tiers that are directly coupled with the monitored tier. The dynamic tier extension monitors request traffic passing through the selected tier, the monitored request traffic including at least one entering request received at a request entry port from an adjacent tier. The dynamic tier extension identifies each request in the monitored request traffic and sends at least the request identifier to the context agent. The context agent also receives information relating to the request context of the entering request from the context agent associated with the adjacent tier. The context agent associates the information relating to the request context of the entering request with the entering request, in accordance with the received request identifier. The system further includes a context network management server. The context network management server is coupled with the context agents. The context network management server collects and analyzes performance data received from the context agents.

In accordance with the disclosed technique, there is further provided a method for application performance management in a multi-tier computing environment including a plurality of tiers. The method includes, for each of at least two monitored tiers of the plurality of tiers, the procedure of receiving information relating to the request context of at least one entering request, the information including at least a request identifier and a transaction identifier. The method further includes the procedure of monitoring request traffic passing through the monitored tier, the monitored request traffic including at least the entering request. The method further includes the procedures of identifying the entering request in accordance with the request identifier, and associating the entering request with a transaction in accordance with the transaction identifier.

In accordance with the disclosed technique, there is further provided another method for application performance management in a multi-tier computing environment including a plurality of tiers. The method includes, for each of at least two monitored tiers of the plurality of tiers, the procedure of monitoring request traffic passing through the monitored tier, the monitored request traffic including at least an entering request and an exiting request, the exiting request sent from the monitored tier to an adjacent tier. The method further includes the procedures of determining information relating to the request context of the entering request, and identifying each request in the monitored request traffic. The method further includes the procedures of associating the entering request with the exiting request, and sending information relating to the request context of the exiting request to a context agent associated with the adjacent tier.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
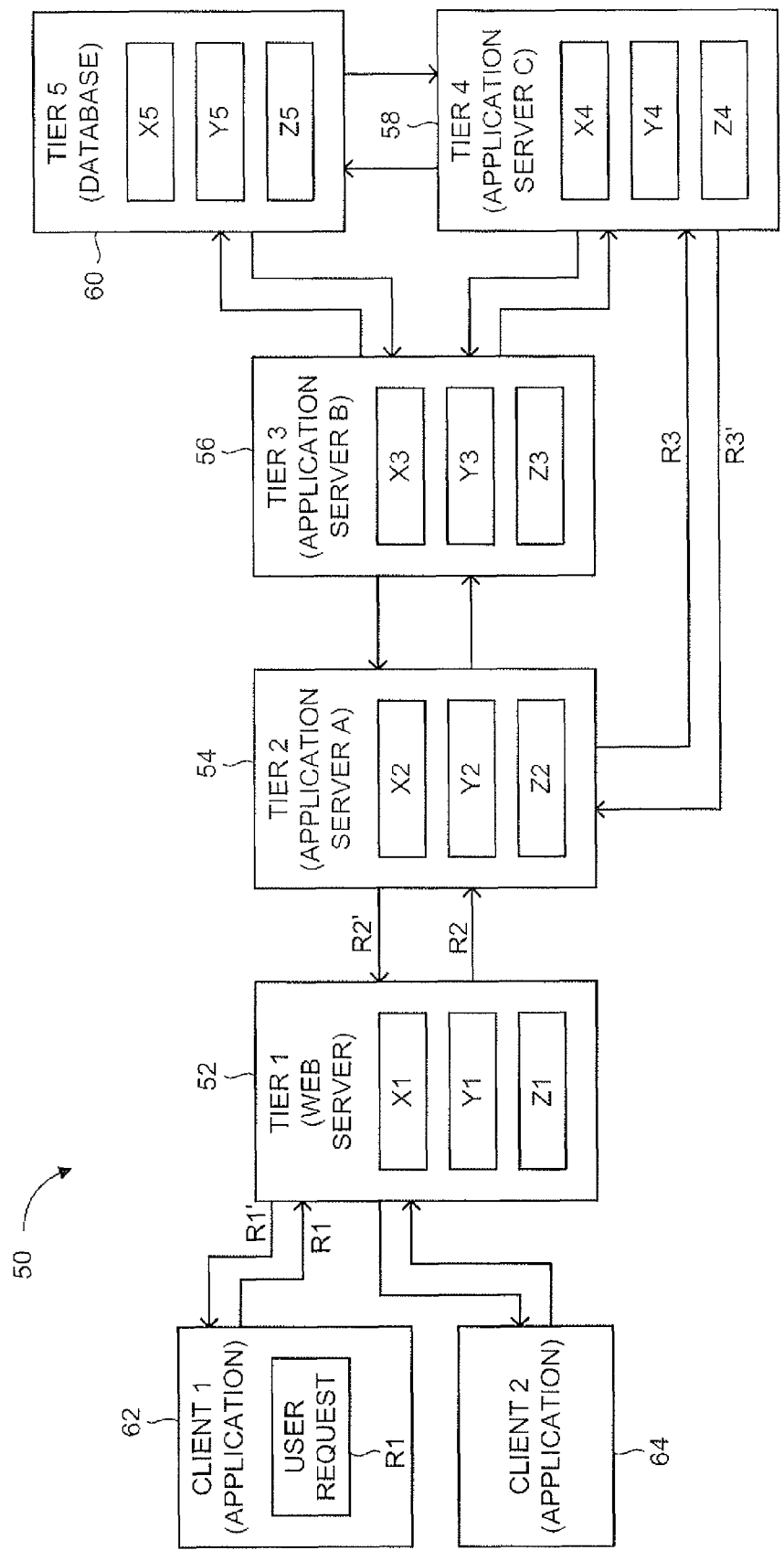
FIG. 1 is a schematic illustration of a multi-tier computing environment, which is known in the art.

The disclosed technique overcomes the disadvantages of the prior art by providing a system and method for application performance management in a multi-tier computing environment. The system monitors the request entry ports and request exit ports of each tier, and detects the entry or exit of requests to or from a given tier, via a plurality of context agents. Each context agent is associated with a tier in the multi-tier computing environment, and capable of communicating with other context agents. A context agent collects information relating to the execution of requests on the tier associated therewith. The context agent identifies the request context of a user request. The context agent classifies the user request into a request class. The context agent relays characteristics of a request exiting the tier associated therewith, to a subsequent context agent associated with the tier to which the request is sent.

The context agent associates a request with a user request and with other previous requests in the same transaction. The context agent assigns a service class to the request in accordance with the request class and a locally stored active service class policy. The context agent may perform intervention to influence the processing of the request, such as adjusting the order of the request on the queue at a request entry port to the tier, altering the priority of a processing enclave executing the request, altering the type of processing of a processing enclave executing the request, instructing the tier to allocate, or to deny, computational resources (e.g. central processing unit—CPU, memory, and the like) to process the request, putting the request on hold and freeing the processing enclave, or terminating the request. A context network management server may profile the behavior of different types of requests across several tiers and may set an appropriate cross-tier service class policy. The system thereby provides for context related resource management at a transaction level, across the different tiers in the multi-tier computing environment.

The disclosed technique provides proactive transaction workload management capability across all tiers in an IT infrastructure chain. The system integrates with the IT infrastructure tiers, such as web, application, database, and middleware servers. The system automatically profiles workloads, helps classify the workloads, and enables a user to create appropriate service class performance policies. The system continuously applies these policies to transactions across the tiers in the computing environment. The system utilizes the existing IT infrastructure and enhances the existing IT infrastructure to enable the balanced delivery of services at optimal service levels consistent with business interests. The following terms are used throughout the description of the embodiments:

The term "tier" herein below, refers to an entity that delivers a certain type of service, wherein the service is part of the overall delivery of an IT transaction. The service may be presentation level processing on a web server tier, application functionality on an application server tier, data processing on a database tier, and the like. Each tier typically runs on a different host machine, although there may be more than one tier operating on a single host machine, and a single tier may include multiple components residing on more than one host machine. The host machine on which at least one tier runs, is herein below referred to as a "tier host". Examples of a tier include but are not limited to: a Java 2 Platform, Enterprise Edition (J2EE) application server instance; a cluster of J2EE application server instances; a database server instance including the access components to the database server such as Java Database Connectivity/Open Database Connectivity (JDBC/ODBC) drivers; a cluster database, and the like.

The term "transaction" represents a single process initiated by a user, such as a stage of a business process within a business application. An example of a transaction is the placing of a bid in an online auction service or the opening of a new customer account at a financial institution. A transaction is made up of a chain of requests between tiers, starting with a user request. Therefore each request is uniquely associated with a user request (i.e., the user request of the transaction). Each transaction is identified via a unique identifier, known as a "transaction ID". It is noted that a "set of related transactions" refers to several transactions which are interrelated (e.g., each transaction represents different stages of a single business process). The handling of a request within a transaction may take into account not only the transaction, but also the set of related transactions to which the request belongs.

The term "request" herein below, refers to a system request from one tier to another tier, in order to provide a certain service that is part of the transaction. Each request is identified via a unique identifier, known as a "request ID". Each request results in a unit of work (UOW) on the invoked tier. Examples of a request include but are not limited to: a client web browser issuing a HyperText Transport Protocol (HTTP) request to a web server; a JAVA program issuing a Remote Method Invocation (RMI) call to an application server; a J2EE application server session bean invoking an entity bean on a remote application server (via RMI), and the like.

The term "user request" herein below, refers to the initial request initiated by either a user or an application, which originates at a tier not monitored by the disclosed technique. The user request is the first request in the chain of requests that makes up a transaction. The chain of requests can be represented as a tree structure with the user request at the root node of the tree.

The term "UOW" herein below refers to the application code executing in the processing enclave allocated to the applicable request on that tier (i.e., a UOW invocation). A UOW is associated with a source and a destination, may have parameters (which are directives for the application code behavior), and uses tier level resources within a single tier.

The term "processing enclave" herein below, refers to any thread, sub-process, database session, and the like, which executes a UOW in a given tier. A request is queued in the tier until an available processing enclave is allocated and the application code (i.e., a UOW) is assigned to the processing enclave. Processing enclaves are generic execution units which in turn execute different application codes.

The term "request context" herein below refers to a set of characteristics that are initially captured from the user request, sent to subsequent requests along the chain of requests of the transaction, and may be modified at any tier along the way. The request context enables the disclosed technique to identify, track and prioritize the resulting chain of requests as part of the single transaction initiated by a user request. The request context may include for example, the characteristics of the user who submitted the request, the characteristics of the item that is the subject of the request, the geographical location from which the request originated, the time and date at which the request is made, the set of related transactions to which the request belongs, and the like. Certain parts of the request context may be modified at subsequent tiers. For example, the service class of the user request that is added to the request context at the first tier, may be overridden by a subsequent tier (i.e., according to another embodiment of the disclosed technique).

The term "request class" herein below, refers to a category of transactions which share one or more pre-defined request context characteristics. For example, a "stock portfolio summary query" may be classified as a "stock portfolio summary query" request class, or may be part of a larger "stock portfolio query" request class together with another transaction, such as a "stock portfolio history query". Each request class is treated in accordance with an active service class policy. Once a request class is assigned to the user request, that request class is automatically assigned to each subsequent request in the transaction initiated by that user request.

The term "service class" herein below, refers to a set of rankings for various parameters that indicate the level of importance for processing the request. The parameters may include: the priority to be assigned to the request, the CPU percentage to be allocated to the request, the memory to be allocated to the request, the priority in allocating and accessing input/output (I/O) devices to the request, and the like. The service class is assigned to a request executing on a given tier by the respective context agent, in accordance with the appropriate active service class policy.

The term "service class policy" herein below, refers to a rule which assigns a service class to a request within a request class, with respect to the tier on which the request is being processed. Each context agent contains a set of tier specific service class policies, each of which maps a service class to a request class for the specific tier associated with that context agent. A "cross-tier service class policy database" describes the set of mappings of service classes to request classes for all the tiers in the multi-tier computing environment. It is noted that a user may define a set of service class policies. Such policies are referred to herein below as "user-defined service class policies".

The term "active service class policy" contains the request class to service class mapping that is currently in effect. Multiple service class policies are supported and a different service class policy may be scheduled at different times of system operation to reflect changing workloads or various system events, or simply as an ad hoc decision.

Figure 2:
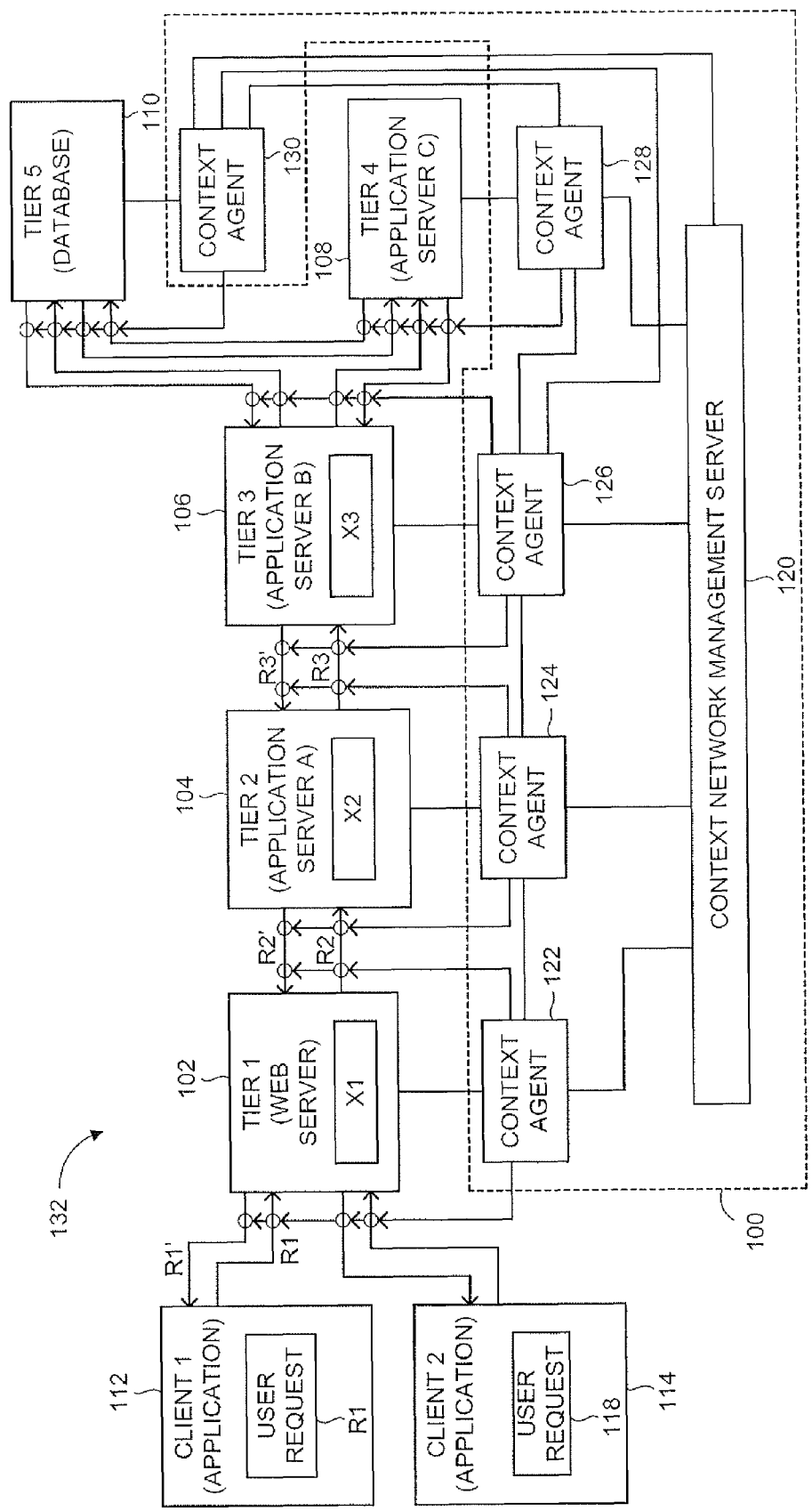
FIG. 2 is a schematic illustration of an application performance management system, constructed and operative in accordance with an embodiment of the disclosed technique.

Reference is now made to FIG. 2, which is a schematic illustration of an application performance management system, generally referenced 100, constructed and operative in accordance with an embodiment of the disclosed technique. System 100 operates on a multi-tier computing environment, generally referenced 132. Computing environment 132 includes a first client 112 running a first application, a second client 114 running a second application, a first tier 102, a second tier 104, a third tier 106, a fourth tier 108, and a fifth tier 110. The first tier 102 is a web server. The second tier 104 is an application server, application server A. The third tier 106 is another application server, application server B. The fourth tier 108 is a further application server, application server C. The fifth tier 110 is a database.

First tier 102 is coupled with first client 112, with second client 114, and with second tier 104. Second tier 104 is further coupled with third tier 106. Third tier 106 is further coupled with fourth tier 108 and with fifth tier 110. Fourth tier 108 is further coupled with fifth tier 110. The first application running on first client 112 initiates a user request R1. The second application running on second client 114 initiates a user request 118.

System 100 includes a plurality of context agents 122, 124, 126, 128 and 130, and a context network management server (CNMS) 120. In the example set forth in FIG. 2, there is a single context agent associated with each tier. In particular, context agents 122, 124, 126, 128 and 130 are associated with first tier 102, second tier 104, third tier 106, fourth tier 108 and fifth tier 110, respectively. Context agents 122, 124, 126, 128 and 130 are coupled with CNMS 120. Each context agent is also coupled with other context agents in accordance with the coupling of the tiers in computing environment 132. In particular, context agent 122 is coupled with context agent 124, context agent 124 is further coupled with context agent 126, context agent 126 is further coupled with context agent 128 and with context agent 130, and context agent 128 is further coupled with context agent 130.

First client 112 requires a service from first tier 102 and first client 112 sends a user request R1 to first tier 102. User request R1 waits on a queue at a request entry port of first tier 102. First tier 102 assigns an available processing enclave X1 to process user request R1. While processing user request R1, the application logic executing in processing enclave X1 determines that processing enclave X1 cannot complete processing user request R1 without additional information or operations to be provided by second tier 104. Therefore, first tier 102 sends a new request R2 to second tier 104, requesting the additional information or operations. Second tier 104 assigns an available processing enclave X2 to process request R2. The application logic executing in processing enclave X2 determines that processing enclave X2 requires further information or operations to be provided by third tier 106. Therefore, second tier 104 sends a new request R3 to third tier 106. Third tier 106 assigns an available processing enclave X3 to process request R3. It is noted that each of requests R1, R2, and R3 is part of a single transaction which originates from the application running on first client 112.

Processing enclave X3 completes processing. Third tier 106 returns a reply R3' to second tier 104, in response to the earlier request R3 from second tier 104. The application logic executing in processing enclave X2 receives the reply R3' and resumes execution. Once processing enclave X2 has completed processing, second tier 104 returns a reply R2' to first tier 102 in response to the earlier request R2 from first tier 102. The application logic executing in processing enclave X1 receives the reply R2' and resumes execution. Once processing enclave X1 has completed processing, first tier 102 returns a reply R1' to user request R1, which has now completed.

Figure 3:
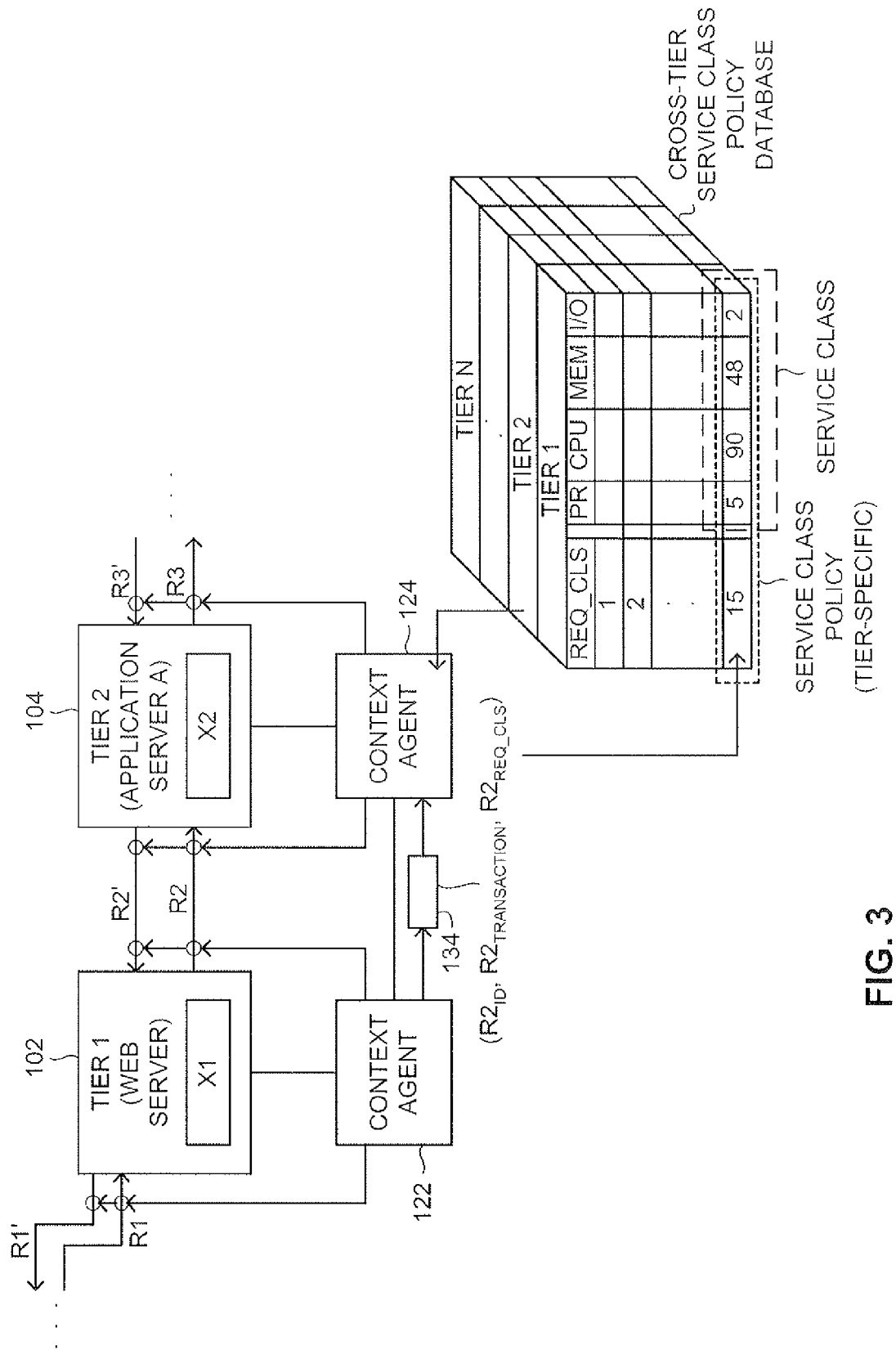
FIG. 3 is a schematic illustration of information relaying between two of the context agents of the system of FIG. 2.

Each context agent monitors the tier associated therewith at the request entry ports and request exit ports of the tier (represented as small circles in FIGS. 2 and 3). The context agent monitors request traffic passing through the associated tier, by detecting that a request has entered or exited the associated tier. If the request is a user request (i.e., the initial request in a chain of requests), the context agent of the first tier identifies the request context of the user request, classifies the user request into a request class, and assigns a service class to the user request based on the contents of the active service class policy. Each context agent has a policy cache (not shown) which contains the set of tier specific service class policies for the tier associated with the respective context agent. CNMS 120 periodically updates each context agent with the tier specific active service class policies. If the request is not a user request, the context agent receives information relating to the request context of the request, along with additional information relating to the request (i.e., "context information"), from the context agent associated with the tier where that request originated. It is noted that the minimal information included in the context information that a context agent relays to another context agent is at least: the request ID, the transaction ID, the request class, and context related data associated with the request. Context related data may include the request context itself, or an indication (e.g., a pointer) to the request context residing in another location.

The context agent associates the received context information with the request executing on the tier. The context agent may influence the processing of the request, by the respective tier, in accordance with the service class assigned to the request. For example, the context agent may adjust the order of the request on the queue at a request entry port to the tier, or may instruct the tier to allocate, or alternatively to deny, computational resources from the tier to execute the request. If the context agent detects that a request has exited the associated tier, the context agent relays context information to another context agent associated with the tier to which the request has been sent. This other context agent associates the received context information with the relevant request, and with the processing enclave executing the request on the tier associated with this other context agent.

It is noted that the context agent monitors the request entry ports and request exit ports of the tier, rather than extensively monitoring the activity that occurs within the tier itself (e.g., the processing enclave executing a request). As a result, system 100 does not interfere with the actual operation of a given tier or the user application code executing in the tier from a software perspective, and system 100 adds minimal additional load to the tiers.

The context agent is also coupled with the associated tier via a dynamic tier extension (DTE—not shown in FIG. 2). The DTE enables the context agent to collect data relating to the execution of UOWs on that tier. The context agents may send raw data to CNMS 120 for archiving purposes. The context agents may further send to CNMS 120 statistical data for aggregated analysis. The context agents may receive information from CNMS 120 such as activity profiles (defined herein below with reference to FIG. 6) and new active service class policies for the handling of different types of request classes. The context agent is elaborated upon in detail in FIG. 8 herein below.

In particular, context agent 122 monitors first tier 102 and detects that user request R1 has entered first tier 102. Context agent 122 identifies the request context of user request R1 and associates user request R1 with processing enclave X1 processing the request. Context agent 122 classifies user request R1 into an appropriate request class. Context agent 122 determines the service class of user request R1 in first tier 102, by retrieving the appropriate active service class policy in the set of service class policies context agent 122 has stored, and assigns user request R1 the determined service class. Context agent 122 adds the assigned service class to the request context. When new request R2 exits first tier 102 toward second tier 104, context agent 122 detects that request R2 is related to user request R1. Context agent 122 then sends context agent 124 information relating to the request context of user request R1, together with the request ID, the request class, and the transaction ID associated with request R2.

Reference is now made to FIG. 3, which is a schematic illustration of information relaying between two of the context agents of the system of FIG. 2. Context agent 122 sends context agent 124 a message 134. Message 134 includes the request ID of request R2, the transaction ID of request R2, the request class that context agent 122 classified request R2 into, and the request context of request R2. Context agent 124 receives message 134 and determines the service class of request R2 which is to be executed on second tier 104, by retrieving the appropriate active service class policy in the set of service class policies which context agent 124 has stored. Context agent 124 assigns request R2 the determined service class. For example, the request class of request R2 is group "15". Context agent 124 retrieves the active service class policy that maps a service class to requests of request class "15" that are executing on second tier 104. The appropriate service class policy assigns a priority of "5" to such requests, a CPU allocation of "90", a memory allocation of "48", and I/O device access priority of "2". Context agent 124 may then influence the processing of request R2 in accordance with the assigned service class.

System 100 performs application performance management on a request context basis. System 100 identifies the requests, and the characteristics relating to each request are available at the context agent associated with the tier. These characteristics may include where that request initiated, which requests preceded the request in the transaction, and what type of request it is. For example, context agent 124 identifies that request R2 operating on second tier 104 is associated with user request R1 that was processed by first tier 102 and initiated in first client 112. Since the context agent of a given tier is aware of the request context and the request class of each request which is being executed at the respective tier, the context agent can determine the appropriate tier specific service class of the respective request based on the service class policy. CNMS 120 can set the overall management policy across several tiers, respective of different request classes, and update the context agents accordingly.

Figure 4:
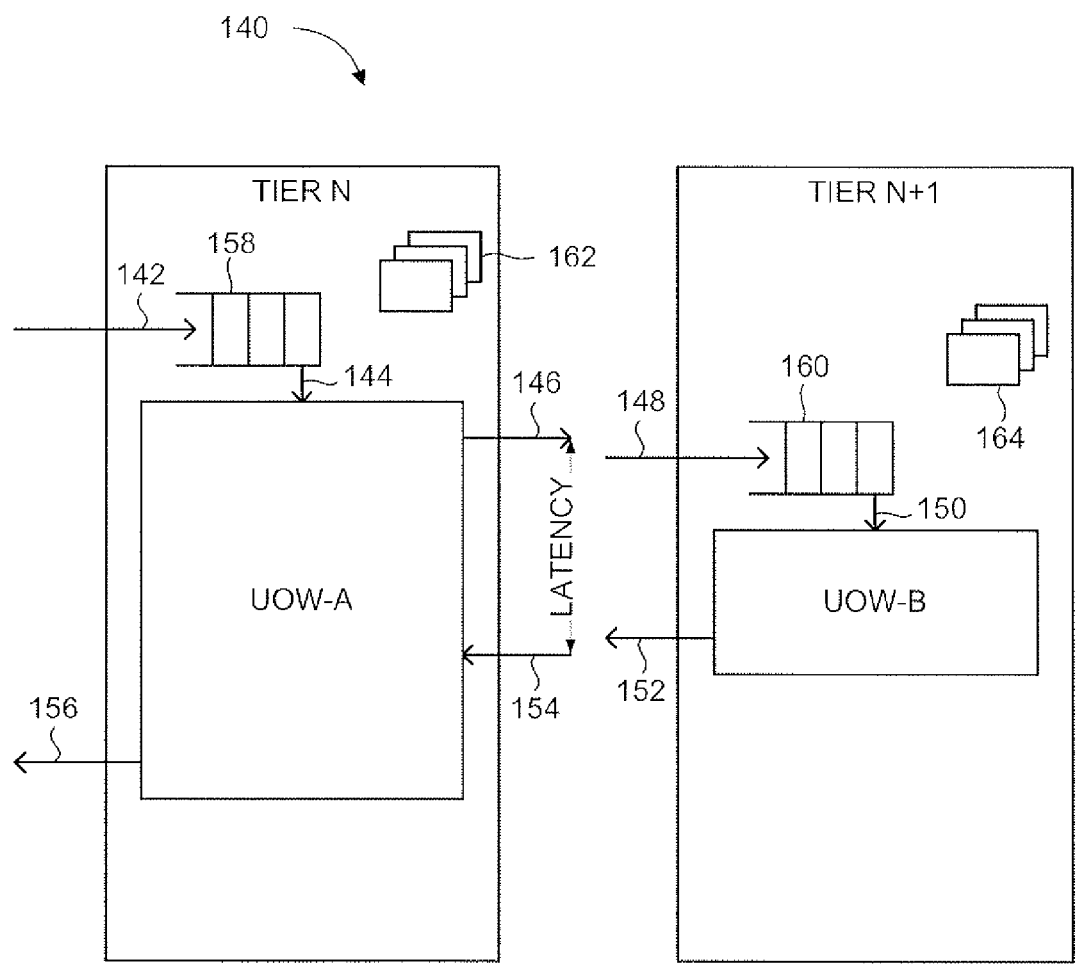
FIG. 4 is a schematic illustration of a sample request life cycle over two of the tiers of the system of FIG. 2.

Reference is now made to FIG. 4, which is a schematic illustration of a sample request life cycle, generally referenced 140, over two of the tiers of the system of FIG. 2. Sample life cycle 140 depicts the stages a request undergoes as the request is being serviced in multi-tier computing environment 132 (FIG. 2). It is recalled that a request causes an invocation of a UOW, which may further generate additional requests, either internally within the same tier (by sending a request to the same tier on which the UOW is being executed), or externally (by sending requests to other tiers). Hence, a user request typically spawns a series of invocations of UOWs, each of which may be performed on a different tier. The invocations of UOWs may be synchronous (i.e., the processing enclave executing the invoking UOW waits for a reply from the invoked UOW before resuming processing) or asynchronous (i.e., the processing enclave executing the invoking UOW continues to process the invoking UOW without waiting for a reply from the invoked UOW). In both cases, the UOW on the invoked tier N+1 is dedicated to the service requested by the invoking tier N. In synchronous processing there are cases where the invoking UOW on tier N waits for the invoked UOW on tier N+1 to end (i.e., the UOW on tier N+1 is de-allocated). In other cases, the invoked UOW on tier N+1 may be referenced multiple times by the invoking tier, until the invoked UOW on tier N+1 ends.

In stage 142, a first request is sent to tier N (i.e., any representative tier) in computing environment 132. The first request results in a UOW invocation on tier N to provide a service, either for a previous tier or for a user application. The first request waits on a queue 158 on tier N.

In stage 144, the first request exits queue 158 and is allocated a UOW, UOW-A, on tier N. A UOW allocation involves assigning an available processing enclave from one of processing enclaves 162 in tier N and dispatching the request application code to run on that processing enclave. The UOW allocation occurs once target tier resources are available and it is possible to assign the application code to an available processing enclave on tier N. In sample life cycle 140, UOW-A commences execution on tier N.

In stage 146, UOW-A issues a second request to tier N+1. Tier N+1 then invokes UOW-B to execute this request of tier N. In stage 148, tier N+1 invokes UOW-B to execute the second request sent by tier N. The second request waits on a queue 160 on tier N+1. In stage 150, the second request exits queue 160 and UOW-B is allocated to the second request. UOW-B allocation results in the assignment of an available processing enclave from one of processing enclaves 164 on tier N+1 to the application code of the UOW invocation and dispatching the request application code to run on that processing enclave. UOW-B then commences execution on tier N+1. It is noted that the invocation of UOW-B is synchronous, and thus the processing enclave processing UOW-A does not continue processing while waiting for a reply from UOW-B.

In the case that the invocation of UOW-B is asynchronous, the processing enclave processing UOW-A receives an acknowledgement from tier N+1 that the second request sent from UOW-A to tier N+1 was accepted. Upon receiving the acknowledgement, the processing enclave processing UOW-A resumes execution until the processing enclave eventually returns a reply to the first request. After tier N+1 accepts the asynchronous second request, the second request waits on queue 160. The second request is subsequently read by one or more processing enclaves handling the second request, until one of these processing enclaves also removes the second request from queue 160. Each processing enclave handling the second request may also turn the second request into a new user request, which may itself start another chain of requests, thereby starting a new transaction.

For example, a transaction involving an asynchronous request may be a user confirming the purchase of a book in an e-commerce website. The purchase request returns the user to a screen informing that the order is being processed and the user will be notified (e.g., via email or text message). The same purchase request is simultaneously placed on a message queue where the purchase request is later processed by: a processing enclave sending a final approval request to the credit card company; a processing enclave sending a purchase order request to the warehouse; a processing enclave sending an accounting request to the billing system; and the like.

In stage 152, UOW-B returns a reply to UOW-A in response to the earlier invocation of UOW-A, and execution of UOW-B is now completed. The second request has now terminated. In stage 154, UOW-A receives the reply and resumes execution, at which point UOW-B is actually released by tier N+1. UOW-A may then continue executing. The duration of time between when an invoking UOW makes a request and when the invoking UOW receives a reply from the invoked UOW, is known as the "latency" period, or the response time for a given UOW request.

In stage 156, UOW-A completes execution and the first request terminates. It is noted that before completion, UOW-A may require the services of another tier and may invoke a further request in order to provide that service.

It is noted that after UOW-B is allocated in stage 150, and commences execution on tier N+1, an unrecoverable error may occur (e.g., a program exception). In accordance with an embodiment of the disclosed technique, the context agent associated with tier N+1 will record the error and will associate the error to the transaction which commenced with the user request that invoked UOW-A on tier N, providing information as to the nature of the error that occurred on tier N+1.

Figure 5:
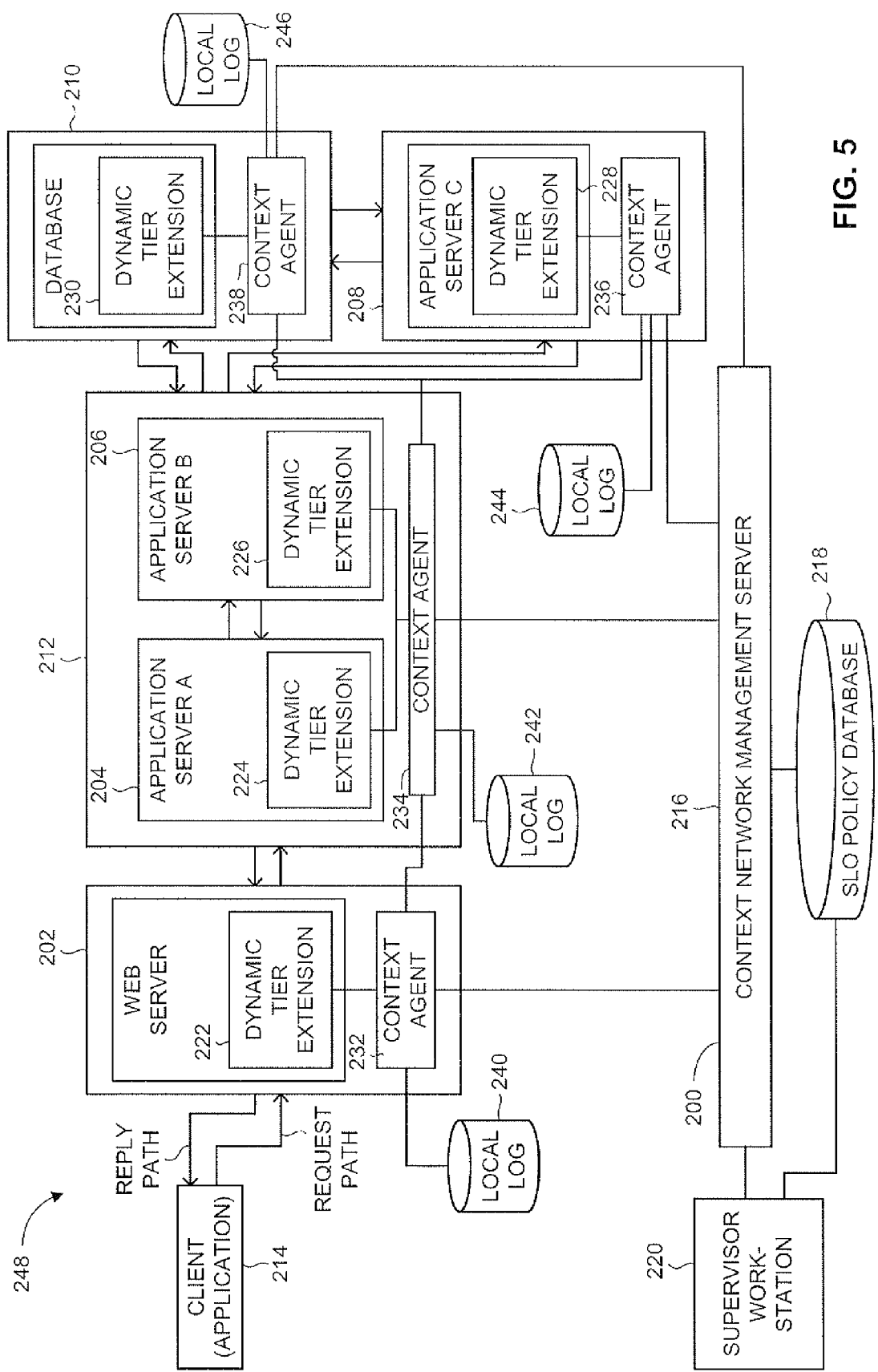
FIG. 5 is a schematic illustration of an application performance management system, constructed and operative in accordance with another embodiment of the disclosed technique.

Reference is now made to FIG. 5, which is a schematic illustration of an application performance management system, generally referenced 200, constructed and operative in accordance with another embodiment of the disclosed technique. System 200 operates on a multi-tier computing environment, generally referenced 248. Computing environment 248 includes a client 214, a first tier 202, a second tier 204, a third tier 206, a fourth tier 208, and a fifth tier 210. First tier 202 is a web server. Second tier 204 is an application server A. Third tier 206 is an application server B. Second tier 204 and third tier 206 both reside on a single host machine 212. Fourth tier 208 is another application server, application server C. Fifth tier 210 is a database. First tier 202 is coupled with client 214, and with host 212. Host 212 is further coupled with fourth tier 208 and with fifth tier 210. Fourth tier 208 is further coupled with fifth tier 210.

System 200 includes a plurality of dynamic tier extensions 222, 224, 226, 228 and 230, a plurality of context agents 232, 234, 236 and 238, a plurality of local logs 240, 242, 244 and 246, a context network management server (CNMS) 216, a service level objective (SLO) policy database 218, and a supervisor workstation 220. Each tier contains a dynamic tier extension (DTE). There is a context agent associated with each tier. There is a local log associated with each context agent. A context agent of a given tier is coupled with the DTE (or several DTEs) within the tier, with the local log associated with the context agent, and with other context agents in accordance with the coupling of the tiers in the computing environment. Each context agent is also coupled with CNMS 216.

CNMS 216 is coupled with SLO policy database 218. Supervisor workstation 220 is coupled with CNMS 216 and with SLO policy database 218.

In particular, first tier 202 includes DTE 222. Context agent 232 is associated with first tier 202. Local log 240 is associated with context agent 232. Second tier 204 includes DTE 224. Third tier 206 includes DTE 226. Since second tier 204 and third tier 206 both reside on host 212, there is only a single context agent 234 associated with both second tier 204 and third tier 206. It is noted that context agent 234 is directly coupled with each of DTE 224 and DTE 226. Local log 242 is associated with context agent 234. Fourth tier 208 includes DTE 228. Context agent 236 is associated with fourth tier 208. Local log 244 is associated with context agent 236. Finally, fifth tier 210 includes DTE 230. Context agent 238 is associated with fifth tier 210. Local log 246 is associated with context agent 238. Context agent 232 is coupled with context agent 234. Context agent 234 is further coupled with context agent 236 and with context agent 238. Context agent 236 is further coupled with context agent 238.

A dynamic tier extension is coupled with the tier at specific predetermined points. These predetermined points are: the request entry ports of the tier, the request exit ports of the tier, and possibly additional areas within the tier (e.g., a tier control port). A request port according to the disclosed technique is a module within a tier which manages requests, either before they are processed by the tier, or after they are processed by the tier. Such a request port can be an interface point (i.e., entrance, exit or any other access mechanism) to a request queue at the entrance of a tier. Since a request requires service from an application code running on the tier by a processing enclave, the respective request port resides at an application level and not at a networking level. It is noted that request ports according to the disclosed technique, are not at a network level (e.g., not TCP/IP or UDP ports).

The DTE is located on the same tier host as the tier associated therewith (i.e., the DTE is located on at least one of the host machines on which the tier is running). Among the responsibilities of the DTE is capturing a request context. The DTE further monitors the request entry ports and request exit ports of a tier, to detect incoming and outgoing requests. The DTE assigns a transaction ID to a user request, and obtains the request ID of each request entering or exiting the tier. The DTE is elaborated upon in detail in FIG. 7 described herein below.

The context agent maintains associations between a given request, the invoked UOW of the request, and the request context of the user request in the same transaction as the request. The context agent relays the request context assigned to each request (i.e., context related data) to other context agents handling other tiers. The context agent may relay the entire request context, or a portion of the request context. Furthermore, the context agent may relay the request context itself, or an indication (e.g., a pointer) to the request context residing in another location. It is noted that the context agent need not necessarily reside on the same host machine as the tier, but this is the case in a preferred embodiment of the disclosed technique. The context agent is elaborated upon in detail in FIG. 8 described herein below. CNMS 216 collects and analyzes performance data. SLO policy database 218 stores cross-tier service class policies, and is continuously updated.

Figure 6:
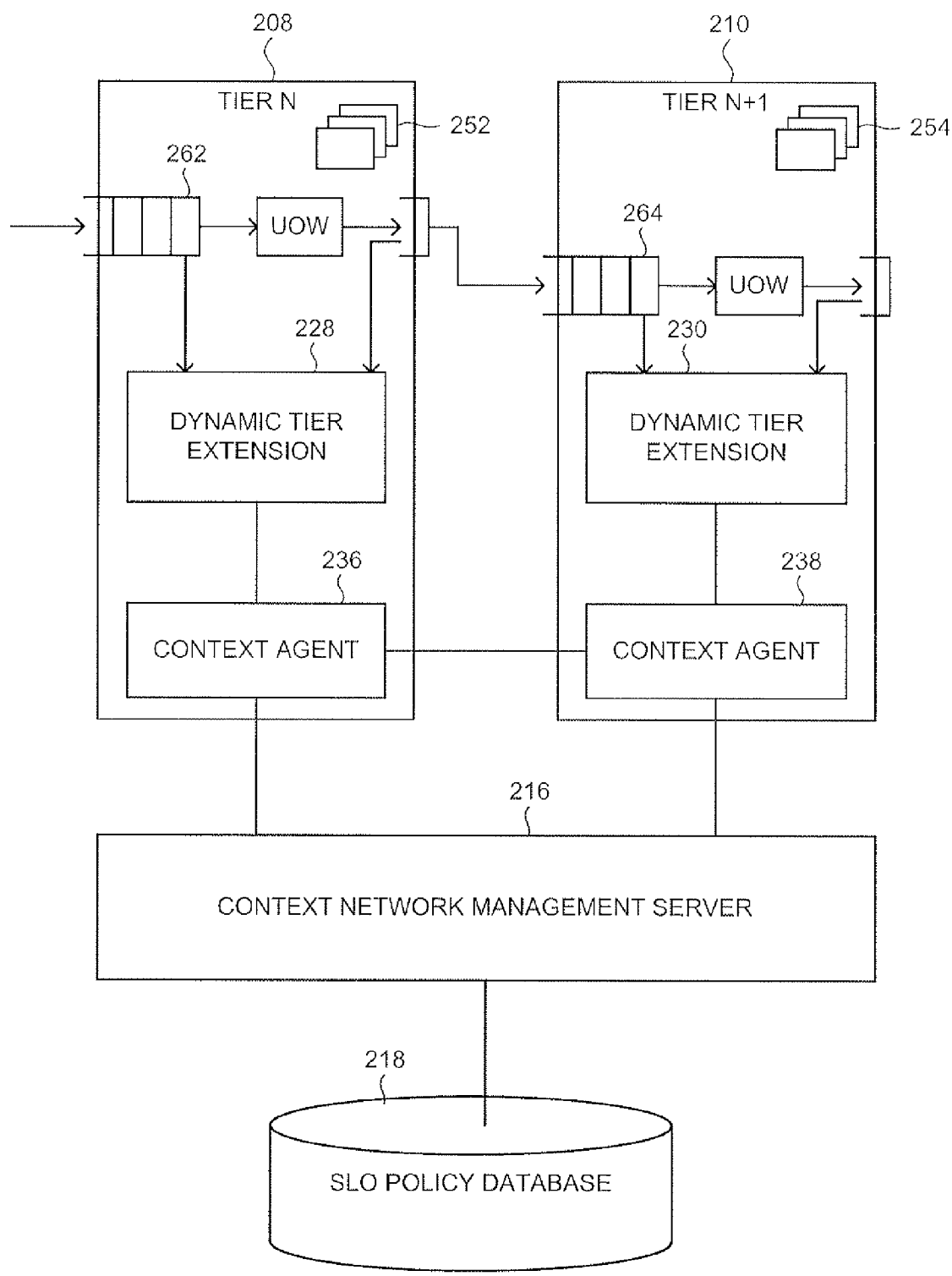
FIG. 6 is a schematic illustration of two of the tiers of the multi-tier computing environment of FIG. 5.

Reference is now made to FIG. 6, which is a schematic illustration of two of the tiers of the multi-tier computing environment of FIG. 5. It is noted that each of fourth tier 208 and fifth tier 210 illustrated in FIG. 6 is representative of any two consecutive tiers (e.g., tier N and tier N+1) in computing environment 248.

A request entering fourth tier 208 waits at a request entry port of fourth tier 208 at a queue 262. Fourth tier 208 invokes a UOW to execute the request. The request exits queue 262 and fourth tier 208 allocates the UOW to the request, by assigning an available processing enclave to the UOW from processing enclaves 252 and dispatching the request application code to run on the processing enclave. The UOW executes on fourth tier 208. The UOW may then request a service from fifth tier 210. The new request exits fourth tier 208 at a request exit port and waits at a request entry port of fifth tier 210 at a queue 264. Fifth tier 210 invokes a UOW to execute the new request. The new request exits queue 264 and fifth tier 210 allocates the UOW to the new request, by assigning an available processing enclave to the UOW from processing enclaves 254, and dispatching the application code of the new request to run on the processing enclave. DTE 228 monitors the request entry ports and request exit ports of fourth tier 208 to detect the requests entering and exiting fourth tier 208, respectively.

The dynamic tier extensions are involved in tracking a request throughout the life cycle thereof, without changing the application code. The DTE dynamically hooks into the tier environment where the DTE intercepts the request context external to the application code. Request tracking includes capturing the request context, associating the request to a UOW on a tier, and disassociating the request from a UOW on a tier. The DTE further collects performance, availability, and error metrics from the tier. The DTE also may dynamically adjust the processing of requests on the tier, such as by adjusting the order of a request on the queue at a request entry port of the tier, allocating computational resources to process the request (e.g., CPU, memory, I/O, and the like) or altering the priority of the processing enclave or the allocated resources. These tasks are elaborated upon with reference to FIGS. 9, 10 and 11 described herein below.

It is noted that there are two alternatives for request context relaying between context agents: in-band and out-of-band. In in-band context relay, the request context is added to the request itself (i.e., onto the payload), as the request exits a certain tier toward the next tier. Therefore, as a request and descendant requests thereof are being processed between different tiers, the updated request context is added to the request invocations. In contrast, out-of-band relaying does not involve the request context being added to the request invocations. Rather the context agents send the context information directly to each other. A context agent sends a request context to another context agent. A DTE retrieves the request context from the context agent. It is noted that each context agent of a system similar to system 200 (FIG. 5) relays the request context to another context agent using the out-of-band technique.

With reference back to FIG. 5, system 200 performs activity profiling. Activity profiling involves creating an activity profile. The activity profile includes integrated transaction, tier, and system level performance metrics and statistical analysis, which are obtained during request tracking. For example, the performance metrics may include: request elapsed time, request service time, consumed CPU time on the tier, and the like. The activity profile data is collected over time and used for both monitoring (i.e., display in the GUI) and for supporting user creation of a user-defined service class policy. An activity profiling console (not shown) is a component of the GUI that displays performance and availability aggregated data gathered by the context agent. The performance and availability aggregated data includes summary views of activity profile data by various categories such as: tier, request class, transaction and the like. An activity profiling engine (not shown) located in CNMS 216 performs activity profiling.

Each context agent has the task of collecting information about the execution details in each tier. The DTE enables the context agent to collect data relating to the execution of UOWs on that tier. The context agents then send the collected information to CNMS 216. The information stored for each UOW includes: start time, request ID of the request to which the UOW is allocated, transaction ID of the request to which the UOW is allocated, request class of the request to which the UOW is allocated, user details, originating network address details, service class of the request to which the UOW is allocated, end time, resource consumption (such as a CPU), and the like.

The context agent stores the information relating to currently executing UOWs in a memory (not shown). Once the UOW has finished executing on the tier the context agent transfers the information to a recent history data store (not shown), which is stored on a disk (not shown) locally at the same tier host of the context agent. After a certain period, the context agent moves the entries from the recent history data store to a summary data store (not shown). This information is stored as a summary over a given period of time (e.g., an average of collected metrics over a period of half an hour). The information in the summary data store is stored in shifts. Shifts are saved on a periodic basis (i.e., they are recycled after a number of shifts have accumulated).

System 200 further includes service class policies. It is recalled that a service class policy refers to a rule which assigns a service class to a request within a request class, with respect to the tier on which the request is being processed. A real time service class policy engine, located in the context agent, assigns an appropriate service class to the request in accordance with information in the request context, such as the request class, performance characteristics of previous executions of requests with the same request context, and in accordance with an active service class policy. Furthermore, assignment of a service class may take into account additional considerations, such as a set of performance metrics for each request class. This set of performance metrics characterizes the request class and creates a baseline for typical performance behavior. This process utilizes the log data created across all tiers and the request classes associated with them. The request classes are stored in a tree structure in SLO policy database 218. The service class policy engine adds and updates information relating to each request class, and updates SLO policy database 218 accordingly.

The service class is determined for the user request in the first tier and then passed from tier to tier along with the request in the request context (from context agent to context agent). There is no need to access CNMS 216 in order to determine the active service class policy and the mapping to the service class. Rather, each context agent has a policy cache therein (not shown) kept up to date, so that the mapping to the appropriate service class is performed locally.

The activity profiling engine polls the local context agents for information about completed and currently running requests at periodic intervals, or whenever necessary and on demand (e.g., when a user wishes to view the currently running requests on the performance console). Alternatively, the activity profiling engine can instruct each context agent to initiate sending new records to the activity profiling engine at fixed intervals or when a threshold (i.e., number of records) is reached. The activity profiling engine collects the data for each request, performs calculations (e.g., average, variance, and the like) and stores the results at various intervals in SLO policy database 218, as a baseline for analysis for each request class. Based on the available data stored in SLO policy database 218, a service class policy generation engine located in CNMS 216 creates a set of rules that serve as recommendations for new service class policies. CNMS 216 determines service class policies using these recommendations. The service class policies are stored in SLO policy database 218.

It is noted that SLO policy database 218 stores policies that are automatically generated as well as user-defined service class policies. A user may create a set of service class policies (i.e., user-defined service class policies) via the user interface (not shown) of system 200, or by editing a configuration file of the context agent. The creation of user-defined service class policies involves user analysis of the activity profiles, and obtaining approval of the suggested service class policy by CNMS 216.

The context agent receives updated service class policies from CNMS 216. It is noted that whether the new service class policy is automatically generated or user-defined is transparent to the context agent. The context agent assigns to a request the service class designated in the appropriate tier-specific active service class policy, located within the local policy cache of the context agent.

Alternatively, the context agent may assign the request a different service class than that designated by the active service class policy in certain situations (e.g., if the tier is currently unable to provide all the resources required to fulfill the service class, if a significant amount of high priority requests enter the tier and may result in resource starvation for lower priority requests, and the like). Further alternatively, the context agent may alter the request class of the request, and subsequently assign the request the service class designated by the appropriate tier-specific active service class policy for the new request class.

System 200 also performs request classification. This involves classifying multiple requests (each designated by their transaction ID and request context) into request classes according to various criteria. An automatic request classification process gathers the generic information associated with a request (e.g., header information, parameters such as query string, Uniform Resource Locator (URL) parameters in the case of an HTTP request type, and the like). When another request of the same request class arrives, this request will be treated in a similar manner as other requests within the request class. The request classes may be grouped into various categories in accordance with the request class performance characteristics in the relevant activity profiles (e.g., a group of request classes having a response time greater than two seconds). Request class grouping is used for reporting purposes, enabling higher level summarized views of request class performance data.

System 200 also supports a user defined classification process wherein the user creates rules that classify requests based on the same request information used for the automatic classification process. A user may create classification rules via the user interface (not shown) of system 200. The automatic request classification process uses a "class based cache management" algorithm, as described by H. Zhu and T. Yang ("*Class-based cache management for dynamic web contents*," Tech. Rep. TRCS00-13, Dept. of Computer Science, University of California, Santa Barbara, 2000). The output of the classification process is a tree representing the request class and the parent classes (i.e., in an automatic request classification process) or a set of classification rules (i.e., in a user defined classification process). All the results of classification processes are stored in the SLO policy database 218.

System 200 is also operative to enforce the service class, as defined in the active service class policy, on each and every monitored tier. Policy enforcement is performed by both the DTE and the context agent. Enforcement may be implemented either by controlling the queuing of requests in each tier (i.e., the order in which the request is actually processed within the tier), or by temporarily changing the processing priority of the processing enclave running the request during execution.

The implementation depends on the particular tier architecture. For example, implementation in a database tier may involve use of a database resource management scheme to manipulate session resource allocation according to the appropriate service class policy. Another example is implementation in an application server tier implemented using a J2EE Application Server application which may involve: extending the application server web queue to support request prioritization, extending the Enterprise JavaBeans (EJB) queue to support prioritization, controlling the JAVA thread priority, and the like.

Figure 7:
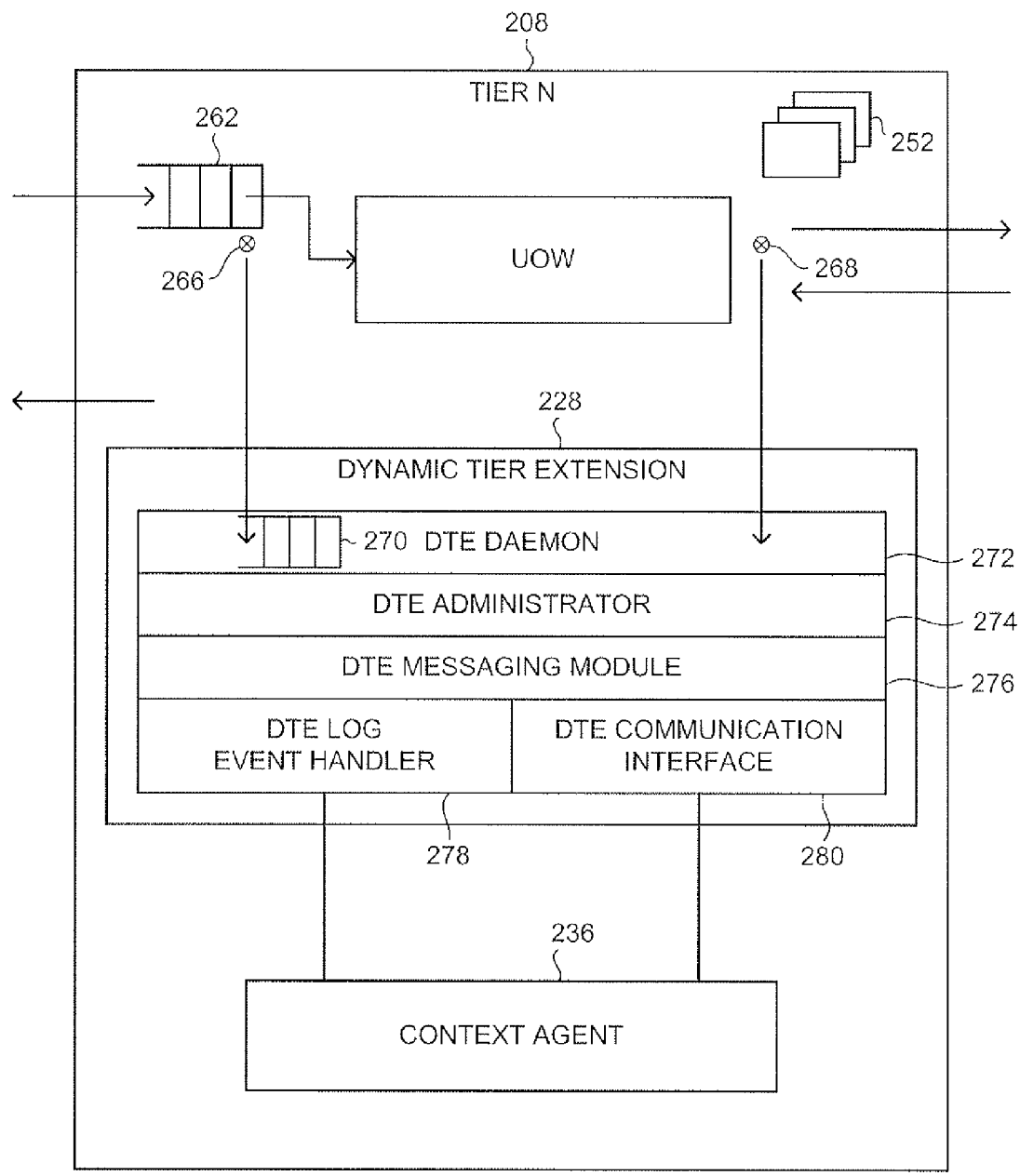
FIG. 7 is a schematic illustration of a dynamic tier extension of the system of FIG. 5.

Reference is now made to FIG. 7, which is a schematic illustration of a dynamic tier extension of the system of FIG. 5. It is noted that DTE 228 of fourth tier 208, depicted in FIG. 5, is representative of all the dynamic tier extensions in system 200. DTE 228 includes a series of soft hooks or interception points into fourth tier 208. These hooks, referenced 266 and 268, serve to collect request related information and performance data. The hooks can also alter the priority of a processing enclave executing a UOW. A hook places the collected information on a dedicated message queue 270. The soft hooking and interception technique depends on the particular environment. For example, the environment may be: a web server, a JAVA based J2EE application server, a database, a messaging server, and the like. It is noted that interception points 266 and 268 may be instantly activated or deactivated by an operator.

DTE 228 further includes a process running within fourth tier 208. The process handles messages from the interception points, communicates messages to context agent 236, returns messages to the interception points, and performs administrative control functions of the DTE (e.g., start/stop tracking requests, installing and removing soft hooks). DTE 228 includes a DTE daemon 272, a DTE administrator 274, a DTE messaging module 276, a DTE log event handler 278 and a DTE communication interface 280.

DTE daemon 272 is an artificially created processing enclave operating within the tier. DTE daemon 272 performs asynchronous processing associated with reported events where the request does not need to be detained. There are two types of scenarios concerning reporting events. In the first scenario, there is no need to detain the request until a response is received. For example, when reporting that a request has ended, there is no need to delay the request until after the context agent has actually been notified. In the second scenario, the request needs to be held for a certain period before processing may resume. For example, when obtaining the service class of a request or when performing classification of a request, processing cannot commence until the request class and service class is determined by the context agent, otherwise processing may be done using an incorrect service class or an incorrect request class.

DTE daemon 272 deals with events of the first scenario, where the request does not need to be detained. The processing is done asynchronously, such that the request is not delayed. The request is thereby released very quickly, almost instantaneously. DTE daemon 272 has a queue 270 associated therewith. After request entries and related request exits are notified by interception points 266 and 268, DTE daemon 272 picks up these notifications from queue 270 and performs whatever additional processing is necessary.

DTE administrator 274 enables DTE 228 to receive messages relating to how requests should be processed. For example, such messages may include: stop tracking a request, continue tracking the request but stop prioritizing, and the like. DTE messaging module 276 communicates with context agent 236 using messages. For example, such messages may include: start or end of a UOW, associate a UOW with a given request, and the like. DTE log event handler 278 logs tracing information concerning DTE operations and logs alerts raised by DTE 228. These logged events could be sent to multiple destinations such as a local file, system message console, system log, and the like. DTE log event handler 278 supports multiple industry standard protocols such as Simple Network Management Protocol (SNMP), and the like. DTE communication interface 280 serves as an interface between DTE 228 and context agent 236. DTE communication interface 280 relays messages sent from agent messaging module 286 of context agent 236 to DTE 228. DTE communication interface 280 also relays messages sent from DTE messaging module 276 of DTE 228 to context agent 236. Multiple communication protocols are supported, and each DTE uses the most efficient communication method available within its architecture, such as inter process communication, Transmission Control Protocol/Internet Protocol (TCP/IP), and the like.

Figure 8:
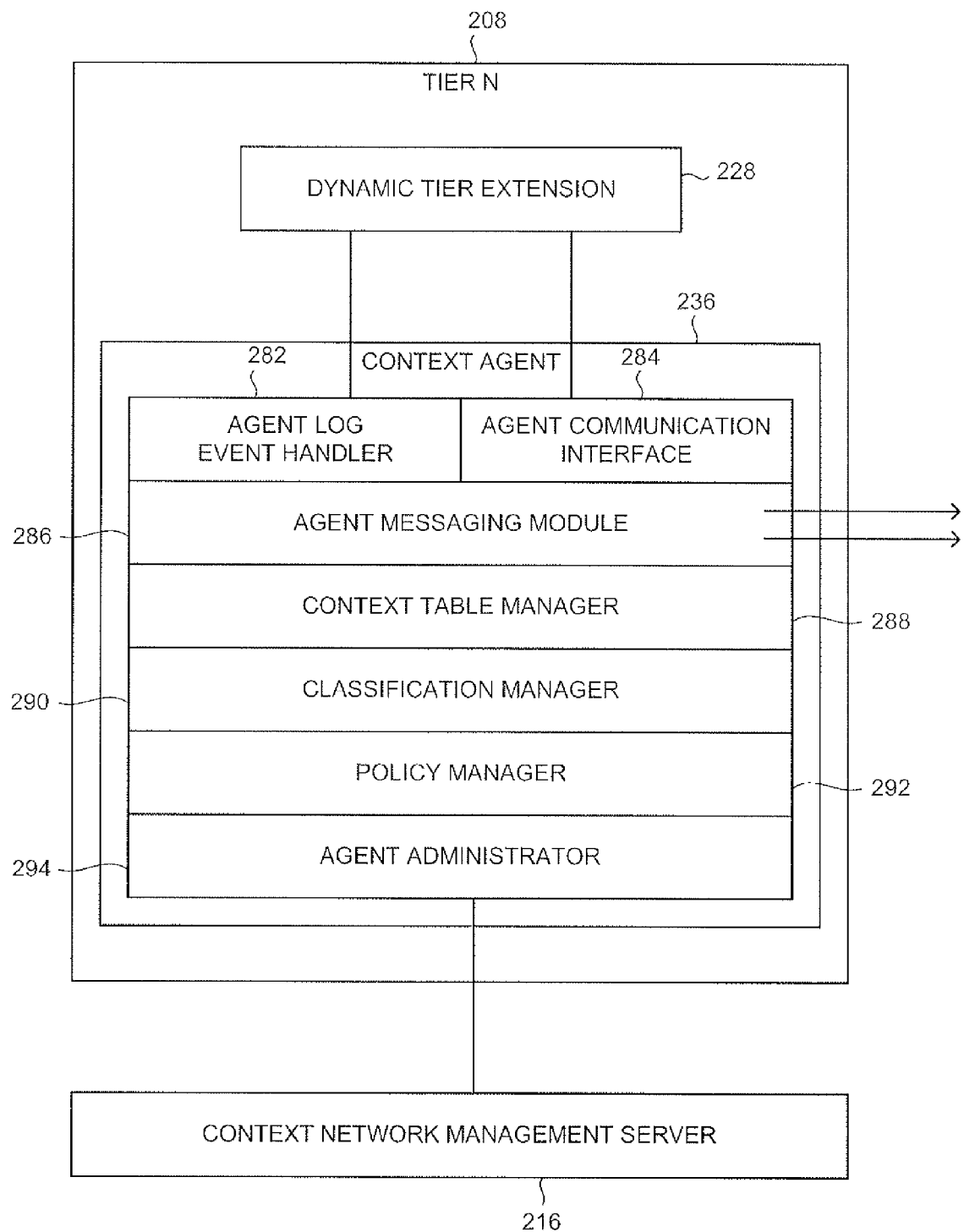
FIG. 8 is a schematic illustration of a context agent of the system of FIG. 5.

Reference is now made to FIG. 8, which is a schematic illustration of a context agent of the system of FIG. 5. It is noted that context agent 236 of fourth tier 208, depicted in FIG. 5, is representative of all the context agents in system 200. Context agent 236 receives notifications from DTE 228 via a variety of mechanisms, such as TCP/IP, inter-process communication channels, and the like. The notifications are of events occurring within the tier, such as: the capture of a request context, the start of an UOW, the end of an UOW, resource consumption of an UOW, the invocation/allocation of an UOW on a remote tier, the reply/release of an UOW on a remote tier, and the like. Context agent 236 includes an agent log event handler 282, an agent communication interface 284, an agent messaging module 286, a context table manager 288, a classification manager 290, a policy manager 292, and an agent administrator 294.

Agent log event handler 282 is used by context agent 236 both for internal housekeeping purposes and for logging alerts raised by context agent 236. Agent log event handler 282 logs information that enters the context table (as described herein below), but is also used for internal tracing and messaging purposes, such as to detect operational irregularities (i.e., problems or errors) that may occur within context agent 236. These logged events can be sent to multiple destinations such as a local file, system message console, system log, and the like. Agent log event handler 282 supports multiple industry standard protocols such as SNMP, and the like.

Agent communication interface 284 serves as an interface between DTE 228 and context agent 236. Agent communication interface 284 relays messages sent from DTE messaging module 276 of DTE 228 to context agent 236. Agent communication interface 284 also relays messages sent from agent messaging module 286 of context agent 236 to DTE 228. There may be several channels connecting DTE 228 and context agent 236, to ensure fast and reliable communication between the two, and at least several channels are kept open at all times, for example a high priority channel and an administrative channel. There may also be several connections of each type of channel, for different types of messages. As a result, agent communication interface 284 is operative to accommodate these different possibilities.

Agent messaging module 286 notifies other context agents associated with remote tiers that a request was sent to the remote tier. Agent messaging module 286 further communicates with DTE 228 using messages. For example, such message include: start or end of a UOW, associate a UOW with a request, and the like. Agent messaging module 286 communicates with DTE 228 via agent communication interface 284.

Context table manager 288 functions as the bookkeeper of the context agent. Context table manager 288 maintains a cross-reference table, known as a "context table", used to associate UOWs running on the tier to their request context. The request context may be from the current tier (i.e., in the case of a user request), relayed from a previous tier from the request execution chain, or both (i.e., the request context is modified or new information is added therein). The context table stores information associated with each request (e.g., transaction ID, request class, service class, origin of request, and the like). Agent messaging module 286 accesses the context table and looks up a record of interest after agent messaging module 286 has received information from DTE 228. Context table manager 288 identifies a request based on information associated with the request and the data stored in the context table. In this manner, context agent 236 obtains information relating to the request entering the tier, such as the request class, service class, and other relevant information associated with the request.

Classification manager 290 and policy manager 292 process each user request that enters the first tier. The first time a user request enters the computing environment there is no information in the context table concerning this user request. The user request is therefore required to undergo classification. During the classification process, all the information known about the user request at a request entry port is collected. For example, if the user request is an HTTP request, then such information includes the HTTP header, the query string, the URL parameters, and the like. For each type of protocol used in each of the tiers, there is a generic plug-in that actually classifies the user request.

The classification process essentially extracts the business perspective from the user request, by translating technical request related information (e.g., an HTTP request) into a formal request classification related to a business process (e.g., retrieve bank account balance). A user request is placed into a specific request class. The user request may be identified as part of a business process or a set of related transactions. For example, retrieval of an account balance may be part of a larger process of applying for a mortgage. When information is transferred from context agent 236 to CNMS 216, CNMS 216 can determine the activity profile and detect request behavior trends for request classes.

Policy manager 292 assigns a service class to the requests. Policy manager 292 receives the output of classification manager 290, and based on the request class, the request context, and the active service class policy, determines the service class of a given request. For example, policy manager 292 may set all requests from a certain request class to have a service class with a higher priority than all requests from a different request class. A context agent assigns a service class to a request being processed on the tier associated therewith, by updating the request context with the appropriate service class according to the active service class policy.

The cross-tier service class policy database includes the set of mappings of service classes to request classes for all the tiers in the multi-tier computing environment. Each request belonging to a certain request class may be assigned a different service class depending on the tier in which the request is being processed. With reference to FIG. 2, user request R1 may be assigned a service class with a low priority on first tier 102, request R2 may be assigned a service class with a high priority on second tier 104 and request R3 may be assigned a service class with a medium priority on third tier 106. The cross-tier service class policies are stored in SLO policy database 218. Cross-tier service class policies may be either automatically generated (i.e., system defined) or defined by a user of the system.

In addition, a supervisor of a local tier (e.g., a database administrator) has administrative control of the tier and may decide to override a service class policy on that tier if deemed necessary. The tier supervisor may alter the service class assigned to a request by the context agent of that tier. The tier supervisor has an overall view of substantially everything running on the tier. It is noted that there may also be an overall supervisor of the system, who is typically a person who runs the user application itself and is interested in the global picture.

It is noted that after the initial classification and policy assignment of a user request, the request class is maintained for subsequent requests of the same transaction, as the context agents relay this information along from tier to tier (i.e., stored in the context table of each tier). In this way, at each tier the context agent identifies which request class a request belongs to, what the tier-specific service class of the request is, and other information associated with the request.

Agent administrator 294 is an interface to CNMS 216. Agent administrator 294 reports historical data to CNMS 216. For example, when a DTE indicates that a UOW has ended, the information associated with that UOW need no longer remain in the context table. The information is then sent from the context table to agent administrator 294, which archives the information and periodically sends the information to CNMS 216. Agent administrator 294 also receives from CNMS 216 new active service class policies, new configurations of the context agent, and the like. Agent administrator 294 may also be interrogated in real-time to obtain a status indication. The status indication may include what information is currently in the context table, which UOWs are now running, and the like.

Figure 9:
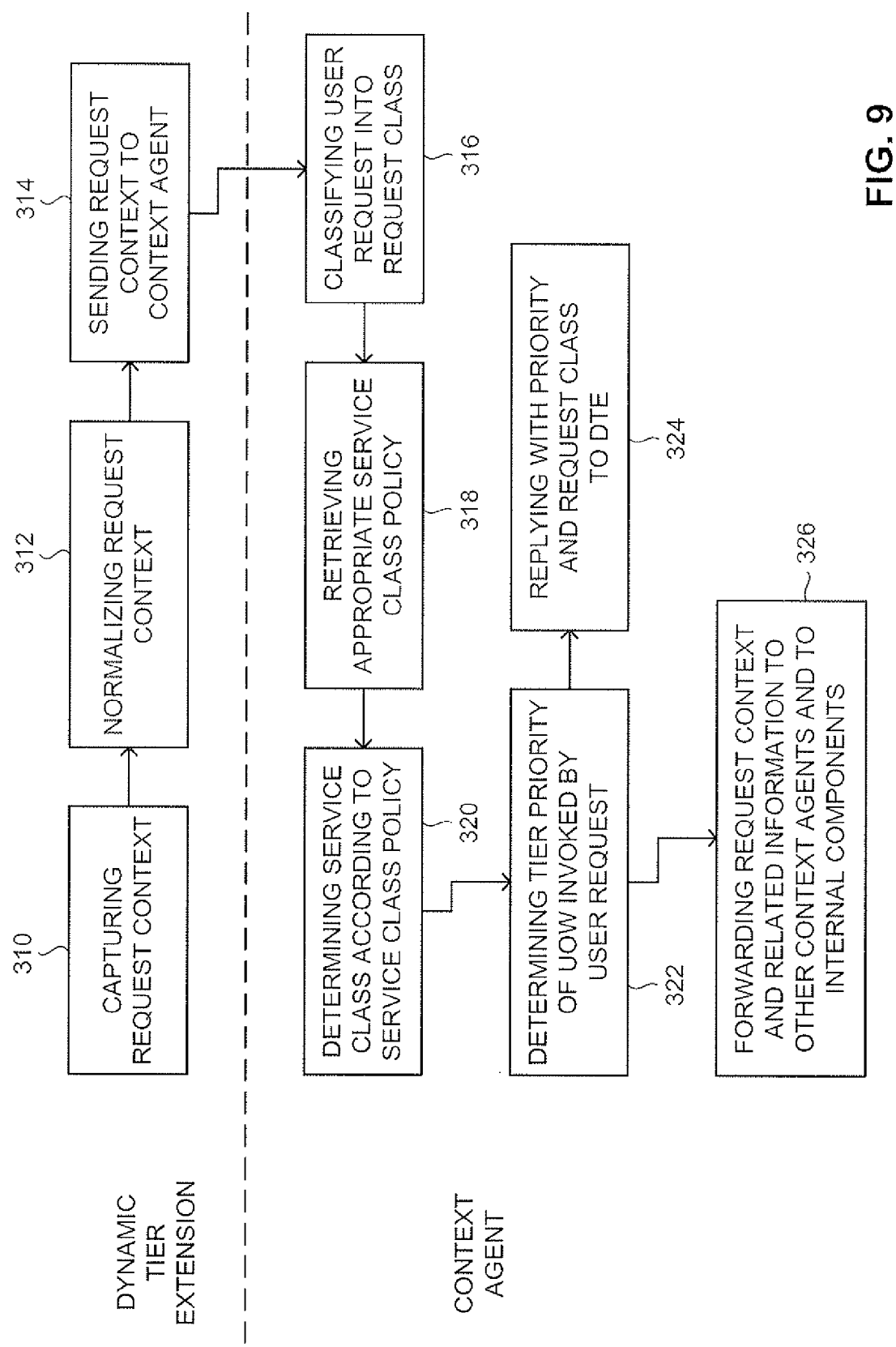
FIG. 9 is a block diagram demonstrating the stages involved in capturing a request context and subsequent processing, operative in accordance with a further embodiment of the disclosed technique.

Reference is now made to FIG. 9, which is a block diagram demonstrating the stages involved in capturing a request context and subsequent processing, operative in accordance with a further embodiment of the disclosed technique. In procedure 310, a request context is captured. A new user request is identified and the request context thereof is intercepted by the DTE soft hook. With reference to FIG. 5, DTE 222 captures a request context of a user request that has entered first tier 202.

In procedure 312, the captured request context is normalized. The DTE converts the request context to a standard format, identical for all types of tiers (e.g., databases, application servers, and the like). The DTE assigns the user request a unique identification (i.e., transaction ID) that will identify the user request and subsequent requests in the transaction initiated by the user request. The DTE further obtains the request ID of the user request from the tier. With reference to FIG. 5, DTE 222 converts the captured request context to a standard format, assigns a transaction ID to the user request, and obtains the request ID of the user request.

In procedure 314, the DTE sends the request context, the transaction ID, and the request ID to the context agent associated with that tier. The DTE notifies the context agent that a new request context has been sent. With reference to FIG. 5, DTE 222 sends the request context, the transaction ID, and the request ID of the user request to context agent 232.

In procedure 316, the user request is classified. The context agent applies a tier specific classification scheme that determines the request class based on the request context. With reference to FIG. 5, context agent 232 classifies the user request into a certain request class.

In procedure 318, the appropriate active service class policy is retrieved from the service class policies stored in the local policy cache. The context agent retrieves the active service class policy using the request class, and possibly other request context fields. With reference to FIG. 5, context agent 232 retrieves the appropriate active service class policy for the user request, in accordance with the request class of the user request, and specific to first tier 202.

In procedure 320, the service class for the user request is determined according to the retrieved service class policy, and assigned to the request. The context agent may then add the assigned service class to the request context. With reference to FIG. 5, context agent 232 assigns the user request the service class of the retrieved appropriate service class policy, and adds the service class to the request context.

In procedure 322, the tier priority is determined for the UOW invoked by the user request. A local priority for the processing enclave executing the UOW is extracted from the service class. With reference to FIG. 5, context agent 232 extracts the local priority for the processing enclave allocated to the user request for executing the UOW, from the assigned service class.

In procedure 324, the context agent sends back the request class and prioritization information to the DTE. This information is necessary for certain tasks, such as altering the priority of a processing enclave, which takes place within the DTE. With reference to FIG. 5, context agent 232 sends the assigned request class and the local priority for the processing enclave executing the UOW to DTE 222.

In procedure 326, the request context and related information (such as request class and transaction ID) is forwarded to other context agents and to internal components of the context agent, most notably the context table that stores the request, which indexes the request context and related information for further reference. With reference to FIG. 5, context agent 232 forwards the request context, along with additional information relating to the request (e.g., the request ID, transaction ID, and request class) to other context agents coupled therewith (e.g., context agent 234), as well as to internal components of context agent 232, such as context table manager 288, classification manager 290, and policy manager 292 (with reference to FIG. 8).

Figure 10:
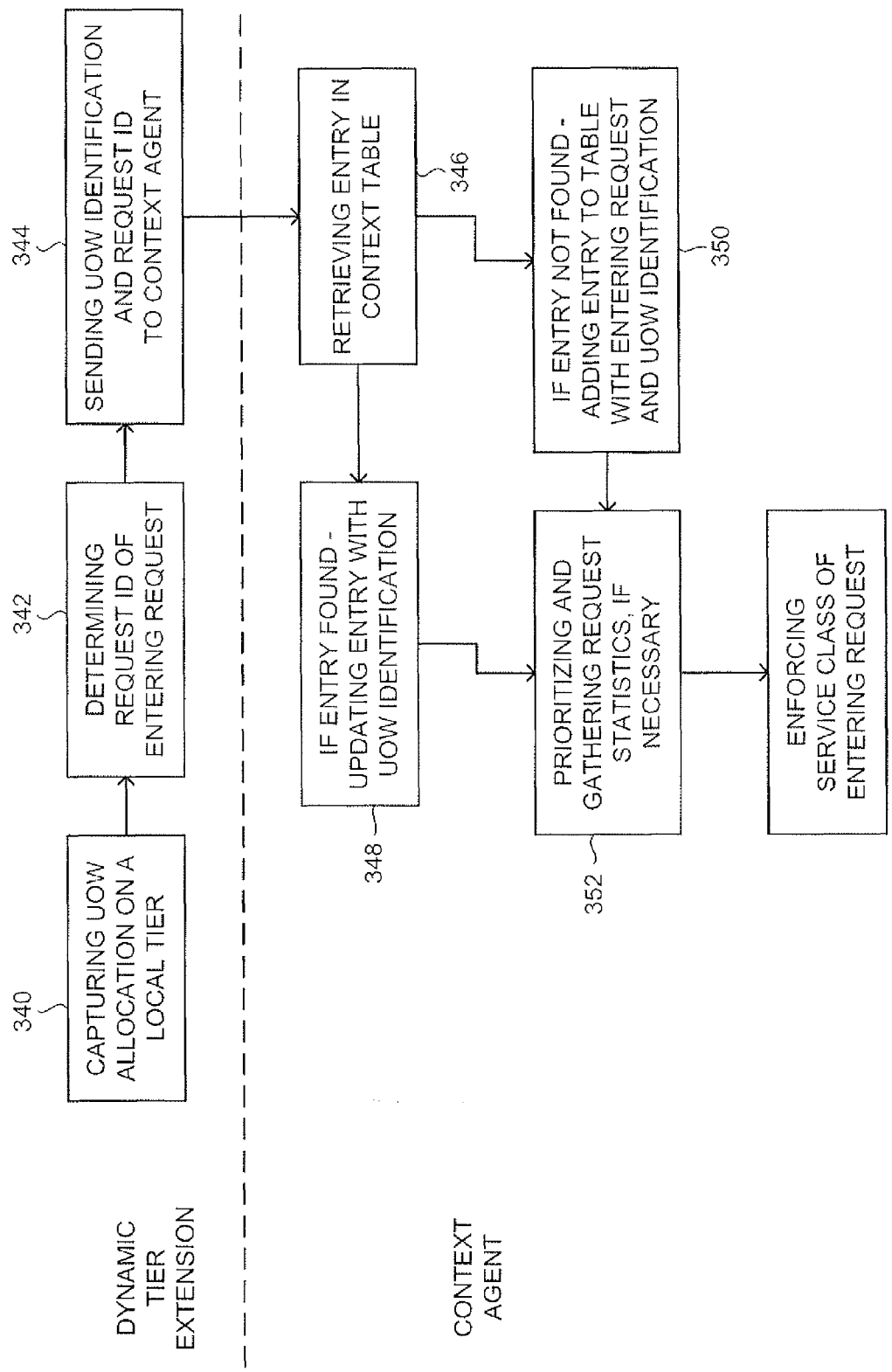
FIG. 10 is a block diagram demonstrating the stages involved in capturing a UOW allocation on a local tier of the system of FIG. 5 and associating a request with the UOW, operative in accordance with yet another embodiment of the disclosed technique.

Reference is now made to FIG. 10, which is a block diagram demonstrating the stages involved in capturing a UOW allocation on a local tier of the system of FIG. 5 and associating a request with the UOW, operative in accordance with yet another embodiment of the disclosed technique. It is recalled that a UOW is the application logic executing in the processing enclave associated with the request on that tier. In procedure 340, a UOW allocation is captured by the DTE. The capturing may occur when the UOW is initially invoked by the tier, as an entering request enters the queue at a request entry port of the tier, while the entering request remains queued, or once resources are available at the tier and the request exits the queue. With reference to FIG. 5, DTE 228 captures a UOW allocation by fourth tier 208.

In procedure 342, the DTE determines the request ID of the entering request associated with the UOW allocation. The request ID is determined based on the information sent from the previous tier, including the request context together with an association key that links the UOW to the request, such as socket identifiers, and the like. With reference to FIG. 5, DTE 228 determines the request ID of the entering request associated with the captured UOW allocation, based on information received from a previous coupled tier (e.g., third tier 206).

There might be situations where the request context and association key do not reach the DTE at the time procedure 342 takes place. Therefore the system could be configured to proceed either by waiting for this information or by assigning a temporary request ID and associating the entering request with a UOW allocation in a later stage.

In procedure 344, the DTE sends information relating to the UOW identification as well as the determined request ID of the entering request, to the context agent. A UOW identification is a set of characteristics uniquely identifying the processing enclave executing the UOW. The UOW identification is used by the context agent for keeping track of the UOW. With reference to FIG. 5, DTE 228 sends association information for the UOW (e.g., an association key that links the UOW to the request, such as socket identifiers), as well as the determined request ID of the entering request, to context agent 236.

In procedure 346, the context agent retrieves the entry in the context table associated with the UOW identification or the request ID. With reference to FIG. 5, context agent 232 locates the entry in the context table via context table manager 288 (FIG. 8) associated with the captured UOW allocation or the determined request ID.

If the entry is found, then in procedure 348, that entry is updated with the UOW identification and related information. With reference to FIG. 5, context agent 232 updates the relevant entry in the context table via context table manager 288 (FIG. 8) with the identification of the captured UOW allocation and related information.

If the entry is not found, then in procedure 350, a new entry is added to the context table. The new entry includes the request ID of the entering request and the identification of the associated UOW allocation. The default request class and service class are associated with the newly added entry. With reference to FIG. 5, context agent 232 adds a new entry to the context table via context table manager 288 (FIG. 8) that includes the request ID of the entering request and identification of the UOW allocation, and associates a default request class and service class to the newly added entry.

In procedure 352, the context agent determines the local priority for the processing enclave executing the UOW, and gathers request statistics if necessary. With reference to FIG. 5, context agent 232 extracts the local priority for the processing enclave executing the UOW invoked by the request from the service class assigned to the request.

In procedure 354, the context agent enforces the service class assigned to the entering request. With reference to FIG. 5, context agent 232 influences the processing of the entering request at first tier 202, by for example, altering the priority level of the processing enclave executing the UOW invoked by the request, altering the type of execution of the processing enclave, or allocating or denying computational resources to process the request.

It is noted that, the context agent can subsequently modify the service class, request class, or other parameters of the request context, if the context agent receives new association information relating to the request. This occurs in a situation where the request context arrives at the context agent associated with the tier from a remote context agent (e.g., with reference to FIG. 5, context agent 234 receives information about a request from context agent 232). Due to timing issues, a context agent may capture the UOW allocation associated with a request, and then receive the request context of the request at a later stage.

Figure 11:
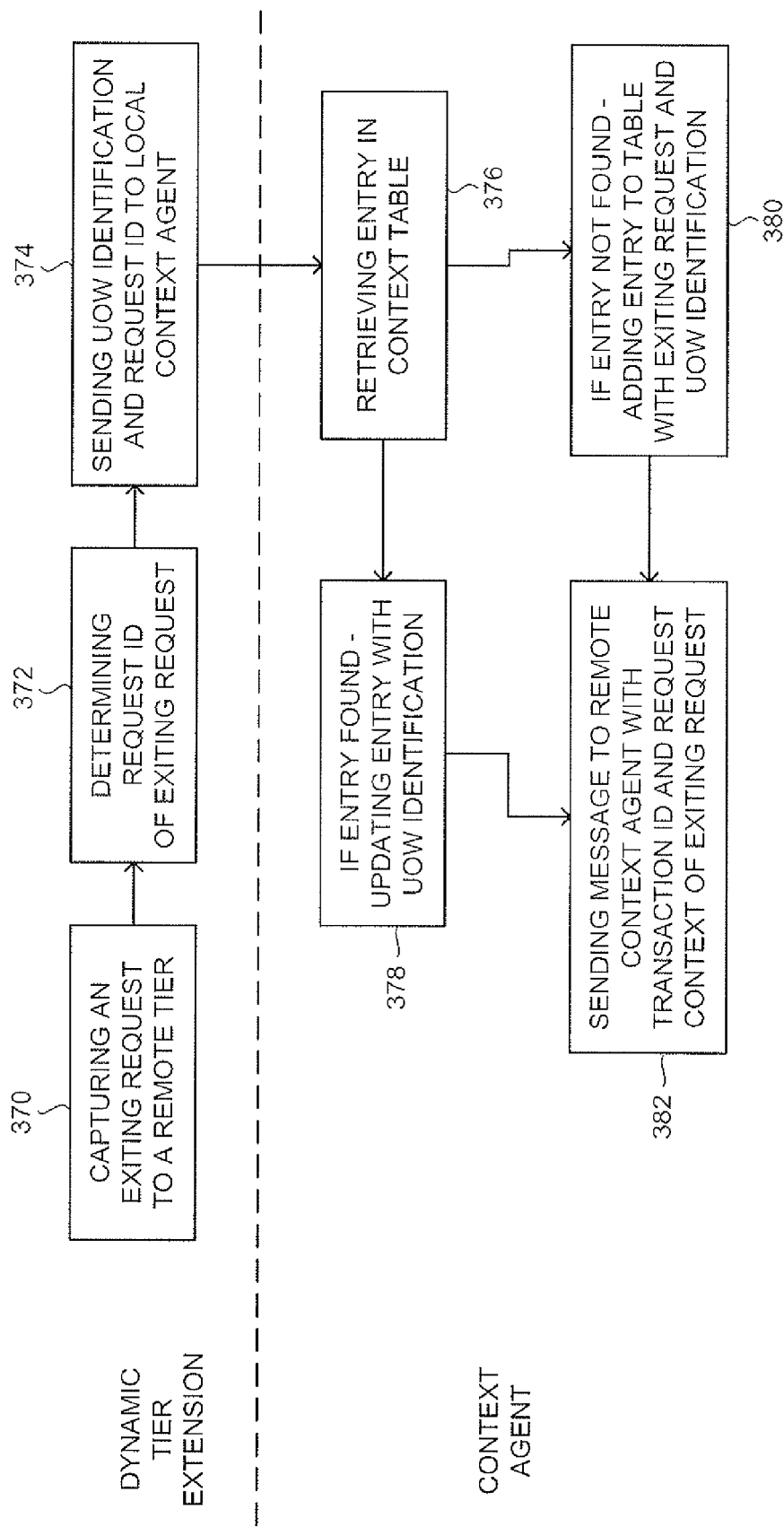
FIG. 11 is a block diagram demonstrating the stages involved in capturing an exiting request sent to a remote tier of the system of FIG. 5, and associating the sent request with the request context, operative in accordance with yet a further embodiment of the disclosed technique.

Reference is now made to FIG. 11, which is a block diagram demonstrating the stages involved in capturing an exiting request sent to a remote tier of the system of FIG. 5, and associating the sent request with the request context, operative in accordance with yet a further embodiment of the disclosed technique. In procedure 370, a request sent to a second tier from a first tier is captured by the DTE of the first tier. With reference to FIG. 5, a request is sent from first tier 202 to second tier 204. DTE 222 captures the exiting request on first tier 202.

In procedure 372, the DTE determines the request ID of the exiting request. With reference to FIG. 5, DTE 222 determines the request ID of an exiting request sent from first tier 202 to second tier 204.

In procedure 374, the DTE sends information relating to the UOW identification, as well as the determined request ID of the exiting request, to the local context agent. With reference to FIG. 5, DTE 228 sends information relating to the UOW identification, as well as the determined request ID of the exiting request, to context agent 236.

In procedure 376, the local context agent retrieves the entry in the context table associated with the request ID of the exiting request or the UOW identification. With reference to FIG. 5, context agent 232 locates the entry in the context table via context table manager 288 (FIG. 8) associated with the determined exiting request ID or by the UOW identification.

If the entry is found, then in procedure 378, that entry is updated with the UOW identification and related information. For example, the entry may be updated with information in the request context of the exiting request that is not currently in the entry. With reference to FIG. 5, context agent 232 updates the relevant entry in the context table via context table manager 288 (FIG. 8) with the UOW identification and with information in the request context of the exiting request that was not previously stored in the relevant entry.

If the entry is not found, then in procedure 380, a new entry is added to the context table. The new entry includes the request ID of the exiting request and the identification of the associated UOW allocation. The request class, service class, and other characteristics of the request stored in the request context are added to the new entry. If certain characteristics are not present in the request context, then default characteristics (e.g., request class and service class) are associated with the newly added entry. With reference to FIG. 5, context agent 232 adds a new entry to the context table via context table manager 288 (FIG. 8) that includes the request ID of the exiting request and characteristics of the request stored in the request context of the exiting request.

In procedure 382, the local context agent sends a message to the remote context agent (i.e., the context agent to which the exiting request was sent). The message includes the request ID of the exiting request, as well as the transaction ID and request class. With reference to FIG. 5, context agent 232 associated with first tier 202 sends a message to context agent 235 associated with second tier 204. The message includes the request ID of the exiting request, as well as the transaction ID and the request class thereof.

In a further embodiment of the disclosed technique, there may be a single context agent associated with multiple tiers hosts. It is noted that the manner in which a context agent communicates with a DTE, enables the context agent to reside anywhere on the network. It is further noted that the context agent keeps track of request and UOWs by attaching a tier identifier thereto, thereby providing for separate bookkeeping for each tier. Such an embodiment may be used, for example, due to security concerns or concerns of extra overhead of a user resulting from the addition of the context agent to the tier host.

In accordance with another embodiment of the disclosed technique, the monitoring system (e.g., system 100 of FIG. 2, or system 200 of FIG. 5) can monitor the code executed by a monitored tier of the multi-tier computing system (e.g., system 132 of FIG. 2). That is, the monitoring system profiles code execution within the monitored tiers. The monitoring system merges the data gathered by profiling (i.e., profiling data) with request-traffic data as gathered by employing the methods detailed herein above with reference to FIGS. 9, 10 and 11. Thereby, the monitoring system identifies the business context of the profiled executed code (i.e., business context profile data). For example, for a selected transaction instance, the operator can view the proportion of time spent at each line of code or method (i.e., subroutine) within the monitored tier.

As mentioned above, the monitored tier is part of a multi-tier computing system. For example, the computing system can be employed for producing and maintaining a retailing website. The computing system executes code for completing various tasks and operations (i.e., business operations) for operating the retailing website. For example, logging in a user, or enabling a user to make online purchase of a selected product. The business operation, for which specific code segments are executed, is referred to herein as the business context of the executed code.

As additionally mentioned above, with reference to the glossary section at the beginning of the detailed description, a code segment executed by the monitored tier, in response to an incoming request, is referred to as a Unit Of Work (UOW). The data describing the business context of an executed UOW can include, for example, the transaction ID of the request to which the UOW is allocated, request class of the request to which the UOW is allocated, user details of the user whose request initiated the transaction, originating network address details, service class of the request to which the UOW is allocated, and the like.

The executed code profiling is performed by employing sampling and instrumentation techniques. Sampling, as referred to herein, is performed by probing the stack traces of the currently executed code within the processing enclaves of the tier. For example, the monitoring system samples the stack traces by employing standard Java Virtual Machine Application Programming Interfaces (JVM APIs). A processing enclave can be a thread, a sub-process, a database session, and the like, which executes a UOW in a given tier. The monitoring system samples the current stack traces both periodically at regular intervals, and ad-hoc according to triggering events, and both would be detailed further herein below.

Instrumentation, as referred to herein, is the addition of code instructions, to the executed code, for gathering data about the execution of the executed code. An example of employing instrumentation is detailed herein above with reference to FIG. 7. The monitoring system employs instrumentation for gathering request-traffic data. The DTE hooks into the entry and exit ports of the monitored tier by introducing code instructions into the code executed by the monitored tier. A hook is a code segment that is instrumented into the profiled program, for example, for intercepting function calls, messages or events, passing between software components of the profiled program. Additionally, in accordance with the currently described embodiment of the disclosed technique, the monitoring system employs instrumentation for gathering profiling data.

Figure 12:
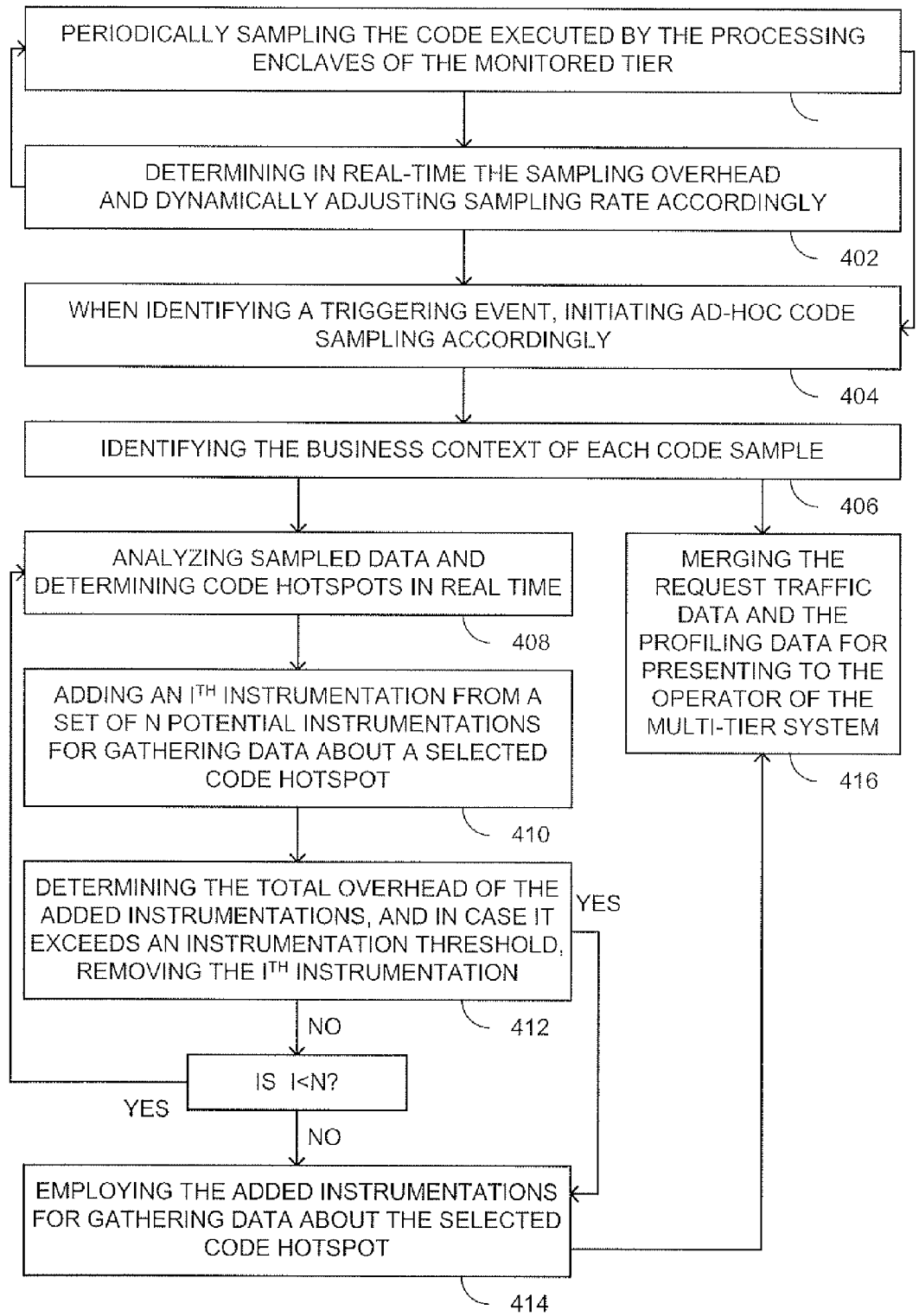
FIG. 12 is a schematic illustration of a method for profiling the code executed by a monitored tier of a multi-tier computing system, operative in accordance with yet another embodiment of the disclosed technique.

Reference is now made to FIG. 12, which is a schematic illustration of a method for profiling the code executed by a monitored tier of a multi-tier computing system, operative in accordance with yet another embodiment of the disclosed technique. In procedure 400, the code executed by the processing enclaves of the monitored tier is periodically sampled. That is the monitoring system samples the executed code at regular intervals. The sampling techniques and the sampled data are detailed further herein below with reference to FIG. 13. With reference to FIG. 5, DTE 222 periodically samples the code executed by the processing enclaves of tier 202.

It is noted that the sampling rate affects the overhead incurred by the periodical sampling. In particular, the sampling overhead increases with the sampling rate. Thus, the monitoring system can adjust the sampling rate for modifying the sampling overhead. For example, in case the overhead is too burdensome, the operator of the monitoring system can decrease the sampling overhead by decreasing the sampling rate. Procedure 402 is an optional procedure for dynamically adjusting the sampling rate according to the sampling overhead. In case the operator does not wish to dynamically modify the sampling rate according to the sampling overhead, the method proceeds to procedure 404 after procedure 402.

In procedure 402, the sampling overhead is determined in real-time, and accordingly the sampling rate is dynamically adjusted. The sampling overhead is determined by the monitoring system. For example, as detailed herein above with reference to FIG. 5, monitoring system 200 (e.g., DTE 222) measures the CPU usage of each transaction instance. Thereby, the monitoring system measures the CPU usage associated with the periodical sampling.

In case the overhead exceeds an overhead threshold, the sampling rate can be decreased to reduce the sampling overhead. In this manner the periodically sampled data will be gathered over a longer period of time for maintaining reduced sampling overhead. For example, assuming 40 data samples are required for identifying hotspots within the executed code. In case the current stack traces of the threads of the tier are sampled once every 0.2 seconds, it would take 8 seconds to obtain 40 samples, and in case the current stack traces are sampled once every 0.5 seconds, it would take 20 seconds to obtain the required number of samples. Therefore, in case the sampling rate is decreased, the time required to obtain the desired number of samples is lengthened. The overhead threshold can be determined by the monitoring system (i.e., automatic threshold selection), by the operator of the monitoring system (i.e., manual threshold selection), or by a combination of both (i.e., semi-automatic threshold selection).

With reference to FIG. 2, monitoring system 100 determines the sampling overhead. Monitoring system 100 determines whether the sampling overhead corresponds with an overhead threshold. In case the sampling overhead exceeds the overhead threshold, monitoring system 100 sets a lower sampling rate. In case the sampling overhead is below the overhead threshold, monitoring system 100 can set a higher sampling rate, up to a pre-determined (via configuration) hard limit. An example of a statistical algorithm for auto-tuning the sampling rate is detailed herein below with reference to FIG. 13.

Apart from the periodical sampling detailed above, the monitoring system can further initiate ad-hoc sampling in response to pre-defined triggering events. The occurrence of a triggering event is determined, for example, according to analysis of instrumentation data or of the periodically sampled data. An example of such triggering event is when the duration of execution of a specific instruction by the monitored tier exceeds a pre-determined execution time threshold. In this case, the monitoring system initiates ad-hoc sampling for gathering data about the execution of the specific instruction where instrumentation was done beforehand. The duration of execution of an instruction is revealed by the analysis of the instrumentation code.

In procedure 404, when identifying a triggering event, ad-hoc code sampling is initiated accordingly. Instrumentation data (i.e., or the periodical sampling data, or both) is analyzed in real-time for identifying triggering events. In case a triggering event is identified, the monitoring system initiates ad-hoc sampling for gathering additional sampling data. With reference to FIG. 5, CNMS 216 analyzes the instrumentation data and identifies a triggering event. DTE 222 initiates ad-hoc sampling of the code executed by tier 202, in accordance with the identified triggering event.

The periodical sampling data is gathered at regular intervals. On the other hand, the ad-hoc sampling data is gathered at a plurality of isolated incidences. Therefore, the periodical sampling data and the ad-hoc sampling data are separately analyzed, such that the regularity of the periodical sampling can be employed for statistical analysis of the periodical sampling data.

It is noted that, procedures 400-404 all relate to sampling the executed code. Therefore, procedures 400-404 can all be combined together to a single general procedure of sampling the executed code.

In procedure 406, the business context of each code sample is identified. The business context relates to the context at which the code is executed. For example, a selected subroutine can be called by a logging server for a first task (e.g., logging on a user or for logging her off) as part of a first business transaction, or by a database server for a second task (e.g., data retrieval or storage) as part of a second business transaction. Identifying the task for which the subroutine was called (i.e., as part of the business context of the sampled code) enables the operator to better monitor and optimize the code. For example, the operator can optimize the executed code for providing faster service to VIP clients, at the expense of less important clients.

The identification of the business context of a sampled code is described in the following paragraphs. In a nutshell, the monitoring system monitors the execution of a UOW by a processing enclave of the monitored tier. The monitoring system samples code level data from the processing enclave during the execution of a specific UOW and associates the sampling data with that UOW. In addition, the monitoring system determines the business context of that UOW as detailed herein above with reference to FIGS. 9-11. That is, on the one hand, the monitoring system associates the sampling data with a respective UOW (i.e., during execution of which it was sampled), and on the other hand, the monitoring system determines the business context of that UOW. Thereby, the monitoring system identifies the business context of the sampled data.

As detailed herein above, with reference to the glossary section (i.e., with reference to the definitions of a request, a UOW and of a processing enclave), a request is queued in the tier until an available processing enclave is allocated for executing the application code (i.e., a UOW) assigned to the request. As detailed further herein above, with reference to FIG. 6, the context agent of the monitored tier collects information about the execution details in the tier. The DTE enables the context agent to collect data relating to the execution of UOWs on that tier. The information stored for each UOW includes: request ID of the request to which the UOW is allocated, transaction ID of the request to which the UOW is allocated, request class of the request to which the UOW is allocated, user details, originating network address details, service class of the request to which the UOW is allocated, resource consumption (such as a CPU), and the like. In other words, the monitoring system identifies the business context of the UOW, according to the context information of the entering request, to which the UOW was assigned.

When the processing enclave of the tier begins executing the UOW, the monitoring system begins collecting code level data (i.e., sampling) and when the processing enclave ends the execution of the UOW, the monitoring system ends the sampling session associated with the execution of the UOW by the processing enclave (i.e., synchronous sampling).

The identification of the business context of the sampled code data is herein exemplified with reference to FIG. 5, tier 202 assigns application code (i.e., a UOW) to an entering request and allocates a processing enclave for executing the UOW. DTE 222 and context agent 232 associate the context information of the entering request with the UOW execution details, thereby identifying the business context of the UOW code. As a processing enclave, allocated to a UOW, begins execution of the UOW, monitoring system 200 begins sampling the code executed by the processing enclave. When the processing enclave ends executing the UOW, the monitoring unit ceases to sample the processing enclave. Thereby, monitoring system 200 associates the sampled code data with the business context of the UOW (i.e., identifies the business context of the sampled code data).

After procedure 406, the method can skip to procedure 416 for merging the sampled data with the request-traffic data for presenting to the operator of the monitoring system. Alternatively, the method of the disclosed technique can proceed to procedures 408-414 for identifying hotspots and for introducing instrumentation code to the executed code, thereby gathering additional profiling data.

In procedure 408, sampled data is analyzed, and code hotspots are determined accordingly and in real time. A hotspot is defined as a portion of the program code in which a large number of executed instructions occur, or in which the executed program spends a considerable period of time. The hotspot determination procedure (i.e., procedure 408) is detailed further herein below with reference to FIG. 14.

As mentioned herein above with reference to procedure 406, the business context of the sampled data is identified. Therefore, the hotspots are determined with the business context in mind. That is, the sampled data can be sliced according to the business context. For example, the monitoring system can reveal that a selected instruction is executed for 8% of the execution time for a first type of clients, and is executed for 2% of the execution time for a second type of clients. With reference to FIG. 5, CNMS 216 analyzes the sampling data for determining hotspots.

In procedure 410, an $i^{th}$ instrumentation from a set of N predetermined instrumentations is added to the executed code (i.e., is instrumented) for gathering data about a selected code hotspot. The set on instrumentations is pre-determined by the operator of the monitoring system and can be modified via configuration. The instrumentations are graded according to the respective incurred overhead from the lightest instrumentation (i.e., incurring the least overhead), to the heaviest (incurring the most overhead). The instrumentations are added according to their order of overhead incurrence, beginning with the lightest and gradually adding heavier and heavier instrumentations, until reaching a pre-determined modifiable overhead limit (i.e., overhead threshold).

Herein are some examples of potential instrumentations (ordered according to their incurred overhead):
  Count number of times a method was called;
  Measure the amount of time spent within a method;
  Measure the amount of CPU consumed in a method;
  Measure the amount of time this method spent on I/O; and
  Measure the amount of time this method was blocked by other threads;

The monitoring system employs JVM tools interface (i.e., JVMTI) which facilitates, among other things, the transformation of byte codes, translated by the JVM to classes. The JVMTI is responsible for hooking into the tier, accepting the original code and returning the instrumented (i.e., transformed) code. For example, incoming HTTP requests in JVMs are usually implemented using the servlets API. The monitoring system adds code before and after the execution of these servlets in order to measure the execution of incoming HTTP requests. The monitoring system extracts data, such as performance data (e.g. start or end time of a Java method, of a UOW, of a call to a UOW on another tier, and CPU time) and parts of messages that are being sent between the tiers executing the transaction (e.g. HTTP parameters or XML segments)

In procedure 412, the total overhead of the added instrumentations is determined, and in case it exceeds an instrumentation threshold, the $i^{th}$ instrumentation is removed. That is, the overhead of the added instrumentations (i.e., the $i^{th}$ instrumentation and the previously added instrumentations of the set of N instrumentations) is determined. In case the combined overhead exceeds an instrumentation threshold, the $i^{th}$ instrumentation is removed. In this case, there is no sense in continuing checking the $(i+1)^{th}$ instrumentation, as its overhead is higher than that of the $i^{th}$ instrumentation, as the instrumentations are ordered according to their respective overhead. Therefore, after the $i^{th}$ instrumentation is removed, the method proceeds to procedures 414.

The instrumentation overhead is determined similarly to the sampling overhead by the monitoring system of the disclosed technique. The instrumentation threshold is determined by the operator of the monitoring system and can be dynamically modified, or set to different values for different situations. Alternatively, the instrumentation threshold is determined automatically or semi-automatically by the monitoring system. The instrumentation threshold for instrumentation respective of a first hotspot may be different than the threshold for instrumentation respective of a second hotspot. For example, the threshold for instrumentation of code associated with a first business context (a user is making a purchase action) differs than that associated with a second business context (a user is browsing through a photo gallery).

With reference to FIG. 5, monitoring system 200 adds an $i^{th}$ instrumentation of a set of N pre-determined instrumentations. In case the overhead of the added instrumentations exceeds an instrumentation threshold, monitoring system 200 removes the $i^{th}$ instrumentation from the executable code.

After procedure 412, in case 'i' is smaller than N (I<N), the method reiterates procedures 408-412 after increasing the value of 'i' by one (i=i+1). Alternatively, in case 'i' equals N or is larger than N, the method proceeds to procedure 414.

In procedure 414, the added instrumentations are employed for gathering data about the selected code hotspot. The monitoring system gathers instrumentation data via the added instrumentation code of the first 'j' instrumentations, out of the N pre-determined instrumentations, which combined overhead does not exceed the overhead threshold. With reference to FIG. 5, monitoring system 200 employs the added instrumentation code for gathering data respective of the code hotspot.

In procedure 416, the request-traffic data and the profiling data are merged for presenting to the operator of the multi-tier system. The profiling data can include periodically sampled data, ad-hoc sampled data and instrumentation data. During data analysis, the monitoring system considers the periodically sampled data separately from the ad-hoc sampled data. The analysis of the periodically sampled data depends on the statistical nature of the periodically sampled data. For example, in case the program was in a specific subroutine for 30% of the running time, analyzing the periodically sampled data, the monitoring system can determine whether the subroutine was called many times for short runs or was called few times for longer runs. On the other hand, the ad-hoc sampled data relates to specific triggering events, and does not reveal information about the execution of the code as a whole.

The merged data is presented to the operator of the monitoring system as a top down view of the transactions executed in the multi-tier system. The operator can jump directly to, or drill down from, each level of the merged data: Application; tier; transaction type; transaction instance; UOWs; and data for each UOW. For example:

subroutines called during the execution of a UOW in a selected business transaction—callTreeOfWu.png—the indentation signifies the order of executions—when subroutine A calls subroutine B, subroutine B is indented to the right.

Aggregated profiling data for an entire tier, including data from various UOWs of different transactions—hotspotsOfTier.png.

As mentioned herein above, the business context of the profiling data is identified (i.e., business context profiling data). Business context profiling data enables the operator to see, for example, that two instances of the same transaction behave differently according to their different business context. For example, a transaction for logging into a website can spend 12% of the execution time in a selected subroutine for a paying subscriber, and can spend 28% of the execution time in the same subroutine for a visitor. The transaction for logging into a website can call the selected subroutine, twice for a paying subscriber, and thrice for a visitor.

Additionally, business context profiling data enables the operator to determine where the application code spends its time, even in the case where the sampling data shows that the program is in a called function from a Java library. The monitoring system can detect via instrumentation that a certain period of execution time should be attributed to another tier or thread. For example, the current HTTP UOW is waiting for a second HTTP UOW. In this case, we can say that the current UOW is in a certain method, which is executing an HTTP request on another tier or thread, and therefore the current UOW is waiting. With reference to FIG. 5, monitoring system 200 merges the request-traffic data and the profiling data for presenting to the operator of the multi-tier system. CNMS 216 analyzes the data for the purposes of displaying to the user. CNMS 216 also aggregates this merged data for the relevant processing enclave, tier, or business transaction, for example.

Figure 13:
FIG. 13 is a schematic illustration of sampled code data, constructed and operative in accordance with yet a further embodiment of the disclosed technique.

Reference is now made to FIG. 13, which is a schematic illustration of sampled code data, generally referenced 450, constructed and operative in accordance with yet a further embodiment of the disclosed technique. The code sampling is performed by the monitoring system, and in particular by the DTE associated with the monitored tier. The sampling is performed by probing the current stack traces of the monitored tier for obtaining sampled current stack traces data from the processing enclaves (e.g., threads) of the monitored tier.

Sampled data 450 (i.e., stack trace 450) includes 8 sampled code lines, first sample 452, second sample 454, third sample 456, fourth sample 458, fifth sample 460, sixth sample 462, seventh sample 464 and eighth sample 466. First sample 452 (i.e., the topmost sample) is the currently executing piece of code. Eighth sample 466 (i.e., the bottom sample) is the root of the executing thread. That is, eighth sample 466 called the one above it, seventh sample 464, which called sixth sample 462, and so on. Each sample specifies the class name, method name and sometimes line of code.

The DTE samples the data by employing standard Java Virtual Machine (JVM) thread management interfaces. For example, the DTE samples the code through APIs of the JVM. There are several APIs for sampling code in Java, such as the ones detailed in the following links:

http://docs.oracle.com/javase/1.5.0/docs/api/java/lang/Thread.html#getAllStackTrace%28%29; and http://docs.oracle.com/javase/1.5.0/docs/api/java/lang/management/ThreadMXBean.html#getThreadInfo%28long[ ],%20int%29.

Each thread of each tier has its own current thread stack trace which lists the sequence of methods currently executed therein. It is noted that when the monitoring system employs the JVM API for sampling the stack trace, the JVM might not immediately give it, and instead wait until execution reaches a certain point called a yield point. Therefore, while the method name in the stack trace is accurate, the actual line number may not be so.

As mentioned herein above with reference to procedure 402 of FIG. 12, the sampling rate can be automatically modified according to the sampling overhead. Detailed herein is an exemplary algorithm for dynamically setting the sampling rate according to real-time measurements of the sampling overhead (i.e., sampling rate auto-tuning algorithm). Whenever the sampling thread (i.e., the thread which samples the stack traces) is activated, the monitoring system measures its CPU time. The monitoring system estimates the 'typical sampling CPU' time according to these measurements using exponential smoothing, as detailed in equation (1):

$$\overline{Sc}_t = a*Sc_t + (1-a)*Sc_{t-1} \qquad (1)$$

Where:

$\overline{Sc}_t$ is the updated estimation of the sampling thread CPU time;

$\overline{Sc}_{t-1}$ is the previous estimation of the sampling thread CPU time;

$Sc_t$ is the latest measurement of the sampling thread CPU time;

a is the history decay factor by which previous measurements are being "forgotten" in favor of new ones;

The monitoring system employs the estimated Sampling thread CPU time $\overline{Sc}_t$ for adjusting new sampling rate, Sr (i.e., the number of samples per second), as detailed in equation (2):

$$Sr_{t+1} = (\% CPU_{target} * \#Processors * 1,000) / \overline{Sc}_t \qquad (2)$$

Where, the nominator of the right side of equation (2) indicates the allowed (i.e., or desired) CPU time per second to be consumed by the sampling thread (i.e., also referred to as profiling thread or Deep Dive thread—DD thread).

Note that, the sampling rate is confided to a maximal threshold. The threshold is determined according to tier overhead, and central server overhead considerations. Additionally, the monitoring system can factor down the target CPU % overhead by some decided constant (i.e. 0.8) since some of the actual overhead, will not be taken into account. That is, the monitoring system does not measure all the overhead associated with profiling activity. For example, the monitoring system does not measure the overhead associated with internal components of the monitoring system communicating therebetween. For instance, the monitoring system does not measure the overhead of DTE communication interface 280 of FIG. 7. Therefore, the monitoring system can factor down the target CPU overhead for compensating for such unmeasured overhead. In other words, the monitoring system does not measure all the overhead associated with its activities and therefore compensates for the unmeasured overhead by a pre-determined factor.

One of the goals of the sampling rate auto-tuning is to adapt the sampling rate to a specific tier (i.e., influenced by factors such as JVM version, concurrency, stack traces lengths and application flow). However the produced sampling (i.e., Deep Dive—DD) overhead within a single tier may itself vary over time. When taking a conservative approach, the guideline is to react fast enough when the sampling rate must be lowered (e.g. due to increase in concurrency), and on the other hand, not to increase the sampling rate too fast, "irresponsibly" (e.g. due to decrease in concurrency). To do that the monitoring system estimates the Sampling thread CPU consumption based on two models of exponential smoothing formulas as detailed with reference to equation (1):

a fast adaptive model: with a relatively high a (i.e. 0.15); and a slower adaptive model: with relatively low a (i.e. 0.03).

Each model indicates a different sampling rate (i.e., either more or less conservative). Thereby, the monitoring system employs the high value of a, for reacting faster to changes requiring to lower the sampling rate, and employs the low value of a, for reacting slower to changes enabling to increase it. The actual values of a (i.e., high and low values) are further determined according to the effective "time-window" for estimations.

Figure 14:
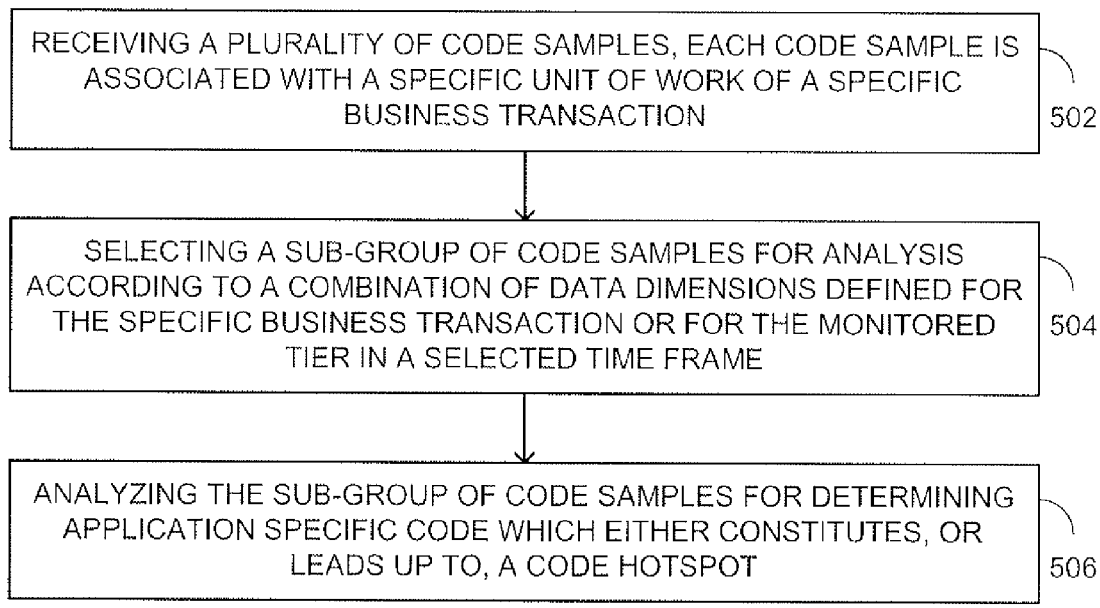
FIG. 14 a schematic illustration of a method for determining code hotspots according to sampled data, operative in accordance with yet another embodiment of the disclosed technique.

Reference is now made to FIG. 14, which a schematic illustration of a method for determining code hotspots according to sampled data, operative in accordance with yet another embodiment of the disclosed technique. The hotspot determining method is an elaboration of procedure 408 of the method described in FIG. 12.

In procedure 502, a plurality of code samples are received. Each code sample is associated with a specific unit of work of a specific business transaction. The code samples are acquired as detailed herein above with reference to FIGS. 12 and 13. With reference to FIG. 5, monitoring system 200 samples the executed code of a processing enclave executing a UOW.

In procedure 504, a sub-group of code samples for analysis is selected according to a combination of data dimensions defined for the specific business transaction or for the monitored tier, in a selected time frame. Data dimensions are descriptive fields relating to the respective transaction, such as the transaction class, the transaction group, transaction origin (e.g., the IP of the server at which the transaction started), the user who initiated the transaction, the tier in which the transaction was executed, and the like. Thereby, during analysis of the sampled data for determining hotspots, the monitoring system considers only sample data relevant for profiling a selected code segment (e.g., profiling the execution of a selected business transaction or profiling of all code executed on the monitored tier).

For example, for profiling a selected instance of a business transaction, the monitoring system can ignore all data samples not sampled during the execution of the selected business transaction. In a similar manner, for profiling a set of related transactions, each with all its instances, the monitoring system would analyze sampled data relevant for each instance of each of the related transactions. Thus, in case the monitoring system is profiling all code executed by the monitored tier, all data samples sampled from the current stack traces of the tier might be considered as relevant.

Therefore, the monitoring system selects the relevant subgroup of data samples and analyzes that subgroup alone. The subgroup of data samples are selected according to different data dimensions (e.g., transaction class, transaction ID, user details), and according to the time frame (i.e., only samples acquired during execution of the profiled code). In other words, the subgroup of data samples is selected according to the business context of the sampled data (i.e., as determined from the context information of the sampled data). With reference to FIG. 5, monitoring system 200 selects a subgroup of data samples for analysis according to the data dimensions and the time frame of the profiled code.

It is noted that in some cases the hotspots occur in a third party code, and not in the application specific code. The application specific code is the application code of the monitored tier, which is the target of profiling. Third party code relates to called methods and subroutines which are taken from third parties and do not specifically belong to the application code. For example, third party code can be taken from open source code libraries, employed by the application code. Therefore, according to the disclosed technique, sampled data which is associated with third party code is distinguished from data samples of application specific code, according to the business context of the sample data.

In procedure 506, the sub-group of code samples is analyzed for determining application specific code which either constitutes, or leads up to, a code hotspot. The selected subgroup of data samples is analyzed for determining hotspots. This is done by the following steps:

We roll the number of samples of third party code up to the calling application code.

The monitoring system assigns a duration value to hotspots based on the sample count and on the duration of the UOW with which they are associated.

After that, the monitoring system adds up the total duration values of the hotspots.

The monitoring system sorts the hotspots according to the duration values and takes the N top methods.

Put another way, because the sampling is random, the monitoring system considers the methods that appear the most times as the ones that were also executed for the longest time (i.e., total execution time).

The third party code is identified according to the names of the java classes. For example, classes whose names start with "com.google" are considered to belong to Google and not to other companies' applications.

In case, the determined hotspot is within third party code and not within application code, the monitoring system can define the application specific code, which called the third party code, as a hotspot or as a location leading to a hotspot. The monitoring system identifies the calling application code according to the profiling data, and according to the request-traffic data.

With reference to FIG. 5, monitoring system 200 distinguishes between samples of application specific code, and samples of third party code. Monitoring system 200 determines hotspots according to the data samples. In case the hotspot is within third party code, the monitoring system can define the application code calling the third party code of the hotspot, as a hotspot.

It will be appreciated by persons skilled in the art that the disclosed technique is not limited to what has been particularly shown and described hereinabove. Rather the scope of the disclosed technique is defined only by the claims, which follow.

The invention claimed is:

1. A method for profiling executable code executed within a monitored tier of a multi-tier computing system, the monitored tier including a plurality of processing enclaves, the method including the steps of:
   periodically sampling the executable code executed by said plurality of processing enclaves of said monitored tier at a periodical sampling rate, thereby producing a plurality of code samples;
   identifying a business context of each of said plurality of code samples, thereby producing profiling data having business context;
   merging request-traffic data respective of the traffic of requests through said monitored tier, and profiling data according to the business context of the request traffic data and of the profiling data; and
   determining in real-time the overhead associated with said step of periodically sampling the executable code, and accordingly dynamically adjusting the periodical sampling rate;
   wherein said step of determining in real-time the overhead associated with said step of periodically sampling the executable code is performed by measuring CPU usage associated with execution of sampling code within said selected tier.

2. The method of claim 1 further comprising the step of analyzing said plurality of code samples for determining code hotspots.

3. The method of claim 2 further comprising the step of adding an $i^{th}$ instrumentation code from a set of N predetermined instrumentation codes, to the executable code executed by said monitored tier, said set of N predetermined instrumentation codes being sorted according to their respective overhead from the lightest to the heaviest, said $i^{th}$ instrumentation code employed for gathering information about a selected code hotspot.

4. The method of claim 3 wherein at least one of said set of N predetermined instrumentation codes being selected from the list consisting of:
   an instrumentation code for counting a number of times a method was called;
   an instrumentation code for measuring the amount of time spent within a method;
   an instrumentation code for measuring the amount of CPU consumed in a method;
   an instrumentation code for measuring the amount of time a method spent on input or output operations; and
   an instrumentation code for measuring the amount of time a method was blocked by a thread.

5. The method of claim 3 further comprising the step of determining a total instrumentation overhead of all executed ones of said set of N predetermined instrumentation codes.

6. The method of claim 5 wherein in case said total instrumentation overhead exceeds an instrumentation threshold, removing said $i^{th}$ instrumentation code.

7. The method of claim 5 wherein, in case said total instrumentation overhead does not exceed an instrumentation threshold, re-iterating said steps of adding an $i^{th}$ instrumentation code and determining a total instrumentation overhead, wherein said step of adding an i.sup.th instrumentation code is performed for an $(i+1)^{th}$ instrumentation code of said set of N predetermined instrumentation codes, and wherein said steps of adding an $i^{th}$ instrumentation code and determining a total instrumentation overhead are re-iterated until i equals N or until said total instrumentation overhead exceeds said instrumentation threshold.

8. The method of claim 3 further comprising the step of gathering information about said selected code hotspot by employing each executed one of said set of N predetermined instrumentation codes for producing instrumentation data.

9. The method of claim 8 further comprising the step of merging the instrumentation data into the profiling data.

10. The method of claim 8 further comprising the step of initiating ad-hoc sampling of the executable code executed by said plurality of processing enclaves of said monitored tier according to analysis of the instrumentation data.

11. The method of claim 10 wherein said step of periodically sampling the executable code, and said step of initiating ad-hoc sampling of the executable code are performed by employing application-program-interfaces of a Java-virtual-machine.

12. The method of claim 1 wherein said step of dynamically adjusting the periodical sampling rate is performed according to the following equation:

$$\overline{Sc}_t = a * Sc_t + (1-a) * \overline{Sc}_{t-1}$$

wherein:
$\overline{Sc}_t$
$\overline{Sc}_t$ is an updated estimation of CPU time associated with said step of periodically sampling;
$\overline{Sc}_{t-1}$ is a previous estimation of CPU time associated with said step of periodically sampling;
$Sc_t$ is a latest measurement of CPU time associated with said step of periodically sampling; and
a is a history decay factor for previous measurements of CPU time associated with said step of periodically sampling.

13. The method of claim 12 further comprising adjusting said periodical sampling rate according to said updated estimation of CPU time associated with said step of periodically sampling.

14. The method of claim 1, further comprising the steps of:
   receiving a plurality of samples of executable code, each sample of executable code being sampled during execution of said selected unit-of-work within said selected processing enclave;
   selecting a sub-group of said plurality of samples of executable code according to a combination of values of a set of data dimensions selected from a plurality of data dimensions defined for said selected business transaction; and
   analyzing said sub-group of said plurality of samples of executable code for determining code hotspots.

15. A method for profiling executable code executed within a monitored tier of a multi-tier computing system, the monitored tier including a plurality of processing enclaves, the method including the steps of:
   periodically sampling the executable code executed by said plurality of processing enclaves of said monitored tier at a periodical sampling rate, thereby producing a plurality of code samples;
   identifying a business context of each of said plurality of code samples, thereby producing profiling data having business context; and
   merging request-traffic data respective of the traffic of requests through said monitored tier, and profiling data according to the business context of the request traffic data and of the profiling data;

wherein said step of identifying a business context of each of said plurality of code samples includes the following sub-steps:

monitoring an entering request entering said monitored tier for determining an allocated unit-of-work, allocated by said monitored tier for handling said entering request;

receiving context information associated with said entering request, the context information indicating a business context of said entering request; and associating each one of said plurality of code samples, which was sampled during execution of said allocated unit-of-work, with said allocated unit-of-work.

* * * * *